US008989286B2

(12) United States Patent
He et al.

(10) Patent No.: US 8,989,286 B2
(45) Date of Patent: *Mar. 24, 2015

(54) MAPPING A TRANSMISSION STREAM IN A VIRTUAL BASEBAND TO A PHYSICAL BASEBAND WITH EQUALIZATION

(75) Inventors: Yong He, Beijing (CN); Kun Tan, Beijing (CN); Haichen Shen, Beijing (CN); Jiansong Zhang, Beijing (CN); Yongguang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/294,093

(22) Filed: Nov. 10, 2011

(65) Prior Publication Data

US 2013/0122949 A1     May 16, 2013

(51) Int. Cl.
*H04K 1/00*     (2006.01)
*H04B 7/24*     (2006.01)
*H04L 5/00*     (2006.01)
(Continued)

(52) U.S. Cl.
CPC ............... *H04B 7/24* (2013.01); *H04L 5/0044* (2013.01); *H04L 27/0006* (2013.01); *H04W 72/00* (2013.01); *Y02B 60/50* (2013.01); *H04L 27/2636* (2013.01)
USPC .............. 375/260; 370/329; 455/62; 455/509

(58) Field of Classification Search
USPC ........................ 375/260; 370/329; 455/62, 509
See application file for complete search history.

(56) References Cited

U.S. PATENT DOCUMENTS 5,099,417 A     3/1992     Magar et al.
5,212,777 A     5/1993     Gove et al.
(Continued)

FOREIGN PATENT DOCUMENTS

CN     1973492     5/2007
CN     101399557     4/2009
(Continued)

OTHER PUBLICATIONS

Advanced Concept Engineering Corp., "Ultra High-Performance Viterbi Decoder Core ACIP Viterbi_K7_", retrieved at <<http://www.acengr.com/datasheet/ACIP_Viterbi_DataSheet.pdf>> on Aug. 11, 2009, pp. 1-8.
(Continued)

*Primary Examiner* — Leila Malek
(74) *Attorney, Agent, or Firm* — Dan Choi; Judy Yee; Micky Minhas

(57) ABSTRACT

Embodiments include processes, systems, and devices for reshaping virtual baseband signals for transmission on non-contiguous and variable portions of a physical baseband, such as a white space frequency band. In the transmission path, a spectrum virtualization layer maps a plurality of transmission components associated with a transmission symbol produced by a physical layer protocol to sub-carriers of the allocated physical frequency band. The spectrum virtualization layer then outputs a physical transmission symbol composed of time-domain samples derived from the mapped frequency components and a cyclic prefix. In the receive path, a time-domain symbol received on the physical baseband is reshaped and equalized by the virtual spectrum layer in order to recompose a time-domain samples of a transmission stream in the virtual baseband.

16 Claims, 7 Drawing Sheets

(51) Int. Cl.
*H04L 27/00* (2006.01)
*H04W 72/00* (2009.01)
*H04L 27/26* (2006.01)

(56) References Cited

U.S. PATENT DOCUMENTS

| | | |
|---|---|---|
| 5,708,593 A | 1/1998 | Saby et al. |
| 5,784,640 A | 7/1998 | Asghar et al. |
| 5,930,298 A | 7/1999 | Choi |
| 6,114,971 A | 9/2000 | Nysen |
| 6,167,031 A | 12/2000 | Olofsson et al. |
| 6,182,030 B1 | 1/2001 | Hagen et al. |
| 6,188,702 B1 | 2/2001 | Tornetta et al. |
| 6,298,035 B1 | 10/2001 | Heiskala |
| 6,298,370 B1 | 10/2001 | Tang et al. |
| 6,351,499 B1 | 2/2002 | Paulraj et al. |
| 6,415,415 B1 | 7/2002 | Karabed |
| 6,557,062 B1 | 4/2003 | Shaler et al. |
| 6,578,153 B1 | 6/2003 | Sankey et al. |
| 6,587,671 B1 | 7/2003 | Kanago et al. |
| 6,654,428 B1 | 11/2003 | Bose et al. |
| 6,665,311 B2 | 12/2003 | Kondylis et al. |
| 6,735,448 B1 | 5/2004 | Krishnamurthy et al. |
| 6,748,034 B2 | 6/2004 | Hattori et al. |
| 6,785,904 B1 | 8/2004 | Franken et al. |
| 6,788,702 B1 | 9/2004 | Garcia-Luna-Aceves et al. |
| 6,825,827 B2 | 11/2004 | Miura |
| 6,864,715 B1 | 3/2005 | Bauer et al. |
| 6,895,512 B1 | 5/2005 | Calbucci |
| 6,963,579 B2 | 11/2005 | Suri |
| 7,016,325 B2 | 3/2006 | Beasley et al. |
| 7,072,818 B1 | 7/2006 | Beardslee et al. |
| 7,142,617 B2 | 11/2006 | Mohan |
| 7,162,204 B2 | 1/2007 | Hansen et al. |
| 7,174,145 B2 | 2/2007 | Chatelier et al. |
| 7,230,978 B2 | 6/2007 | Bitterlich et al. |
| 7,287,077 B2 | 10/2007 | Haugh et al. |
| 7,404,074 B2 | 7/2008 | Murotake |
| 7,444,168 B2 | 10/2008 | Nakagawa et al. |
| 7,565,140 B2 | 7/2009 | Levy et al. |
| 7,610,017 B2 | 10/2009 | Girardeau, Jr. et al. |
| 7,738,913 B2 | 6/2010 | Hilpisch et al. |
| 7,774,017 B2 | 8/2010 | Irita et al. |
| 7,894,556 B2 | 2/2011 | Casabona et al. |
| 7,933,598 B1 | 4/2011 | Agrawal et al. |
| 7,974,176 B2 | 7/2011 | Zheng |
| 8,406,331 B2 | 3/2013 | Orfanos et al. |
| 8,526,412 B2 | 9/2013 | Vijayan et al. |
| 8,526,529 B2 | 9/2013 | Ahn et al. |
| 8,553,521 B2 | 10/2013 | Zhang et al. |
| 2002/0126704 A1 | 9/2002 | Cam et al. |
| 2002/0155811 A1 | 10/2002 | Prismantas et al. |
| 2004/0068730 A1 | 4/2004 | Miller et al. |
| 2004/0153957 A1 | 8/2004 | Feldman et al. |
| 2004/0156449 A1 | 8/2004 | Bose et al. |
| 2004/0185887 A1 | 9/2004 | Wolman et al. |
| 2004/0252684 A1 | 12/2004 | Evans et al. |
| 2005/0124330 A1 | 6/2005 | Hong et al. |
| 2005/0135308 A1 | 6/2005 | Vijayan et al. |
| 2005/0202848 A1 | 9/2005 | Chang |
| 2005/0202858 A1 | 9/2005 | Farber et al. |
| 2006/0109925 A1* | 5/2006 | Kannan et al. ............... 375/260 |
| 2006/0115012 A1 | 6/2006 | Sadowsky et al. |
| 2006/0145897 A1 | 7/2006 | Kadono et al. |
| 2006/0168587 A1 | 7/2006 | Aslam-Mir |
| 2006/0190904 A1 | 8/2006 | Haji-Aghajani et al. |
| 2006/0212624 A1 | 9/2006 | Kim |
| 2006/0227856 A1 | 10/2006 | Ledvina et al. |
| 2007/0002898 A1 | 1/2007 | Boariu et al. |
| 2007/0076649 A1 | 4/2007 | Lin et al. |
| 2007/0083786 A1 | 4/2007 | Chiang |
| 2007/0092018 A1 | 4/2007 | Fonseka et al. |
| 2007/0155429 A1 | 7/2007 | Levy et al. |
| 2007/0178841 A1 | 8/2007 | Oliynyk et al. |
| 2007/0202816 A1 | 8/2007 | Zheng |
| 2007/0247139 A1 | 10/2007 | Veroni et al. |
| 2008/0003949 A1 | 1/2008 | Voonna et al. |
| 2008/0043668 A1 | 2/2008 | Chen et al. |
| 2008/0095100 A1 | 4/2008 | Cleveland et al. |
| 2008/0095135 A1 | 4/2008 | Cleveland |
| 2008/0098133 A1 | 4/2008 | Shaanan et al. |
| 2008/0130519 A1 | 6/2008 | Bahl et al. |
| 2008/0165754 A1 | 7/2008 | Hu |
| 2008/0175421 A1 | 7/2008 | Chizari |
| 2008/0178062 A1 | 7/2008 | Norris et al. |
| 2008/0232487 A1 | 9/2008 | Cleveland et al. |
| 2008/0256606 A1 | 10/2008 | Koikara et al. |
| 2008/0261639 A1 | 10/2008 | Sun et al. |
| 2008/0261650 A1 | 10/2008 | Piriyapoksombut et al. |
| 2008/0268892 A1 | 10/2008 | Hamdi et al. |
| 2008/0300006 A1 | 12/2008 | Rofougaran et al. |
| 2008/0320529 A1 | 12/2008 | Louchkoff et al. |
| 2009/0034457 A1 | 2/2009 | Bahl et al. |
| 2009/0061783 A1 | 3/2009 | Choi et al. |
| 2009/0063057 A1 | 3/2009 | Miettinen |
| 2009/0088104 A1 | 4/2009 | Cheng et al. |
| 2009/0089556 A1 | 4/2009 | Lee et al. |
| 2009/0110033 A1 | 4/2009 | Shattil |
| 2009/0119570 A1 | 5/2009 | Eder et al. |
| 2009/0156129 A1 | 6/2009 | Hassan et al. |
| 2009/0160486 A1 | 6/2009 | Lee |
| 2009/0175381 A1 | 7/2009 | Bougard |
| 2009/0190537 A1 | 7/2009 | Hwang et al. |
| 2009/0196180 A1 | 8/2009 | Bahl et al. |
| 2009/0197627 A1 | 8/2009 | Kuffner et al. |
| 2009/0204725 A1 | 8/2009 | Liu et al. |
| 2009/0232234 A1* | 9/2009 | Du ............................... 375/260 |
| 2009/0235316 A1 | 9/2009 | Wu et al. |
| 2009/0253376 A1 | 10/2009 | Parssinen et al. |
| 2009/0258603 A1 | 10/2009 | Ghaboosi et al. |
| 2009/0298522 A1 | 12/2009 | Chaudhri et al. |
| 2009/0312028 A1 | 12/2009 | Burchfiel |
| 2009/0323600 A1 | 12/2009 | Chandra et al. |
| 2010/0014603 A1 | 1/2010 | Palanki et al. |
| 2010/0031098 A1 | 2/2010 | Kobayashi |
| 2010/0048234 A1 | 2/2010 | Singh |
| 2010/0075704 A1 | 3/2010 | McHenry et al. |
| 2010/0159855 A1 | 6/2010 | Hardacker et al. |
| 2010/0232369 A1 | 9/2010 | Jing et al. |
| 2010/0246377 A1 | 9/2010 | Zhang et al. |
| 2010/0246506 A1 | 9/2010 | Krishnaswamy |
| 2010/0260137 A1 | 10/2010 | Vrzic et al. |
| 2010/0301992 A1 | 12/2010 | Chandra et al. |
| 2010/0304678 A1 | 12/2010 | Chandra et al. |
| 2010/0309806 A1 | 12/2010 | Wu et al. |
| 2011/0096658 A1 | 4/2011 | Yang et al. |
| 2011/0116458 A1 | 5/2011 | Hsu et al. |
| 2011/0122855 A1 | 5/2011 | Henry |
| 2011/0123028 A1 | 5/2011 | Karabinis |
| 2011/0134861 A1* | 6/2011 | Seo et al. .................... 370/329 |
| 2011/0135016 A1 | 6/2011 | Ahn et al. |
| 2011/0188486 A1 | 8/2011 | Kim et al. |
| 2011/0228666 A1 | 9/2011 | Barbieri et al. |
| 2012/0096498 A1 | 4/2012 | Wu et al. |

FOREIGN PATENT DOCUMENTS

| | | |
|---|---|---|
| CN | 101399930 A | 4/2009 |
| JP | 2007088941 A | 4/2007 |
| JP | 2008306665 | 12/2008 |
| JP | 2009515468 | 4/2009 |
| JP | 2009118320 | 5/2009 |
| KR | 20080036534 | 4/2008 |
| KR | 20080098263 | 11/2008 |
| WO | WO9901945 A1 | 1/1999 |
| WO | WO2006000955 | 1/2006 |
| WO | WO2006083495 A2 | 8/2006 |
| WO | WO2007053121 | 5/2007 |
| WO | WO2009018300 A1 | 2/2009 |
| WO | WO2010057302 A1 | 5/2010 |

(56) References Cited

FOREIGN PATENT DOCUMENTS

| WO | WO2010142021 | 12/2010 |
|----|--------------|---------|
| WO | WO2011015960 | 2/2011  |

OTHER PUBLICATIONS

Arslan, "Teaching SDR through a Laboratory Based Course with Modern Measurement and Test Instruments", retrieved from <<http://www.sdrforum.org/pages/sdr07/Proceedings/Papers/1.2/1.2-3.pdf>>, Proceeding of the SDR '07 Technical Conference and Product Exposition, Nov. 5-9, 2007, 6 pgs.

Bahl et al, "White Space Networking with Wi-Fi like Connectivity," SIGCOMM '09, Barcelona, Spain, Aug. 17-21, 2009, 12 pgs.

Bougard, et al., "A Coarse-Grained Array Accelerator for Software-Defined Radio Baseband Processing", retrieved on Jun. 19, 2009 at <<http://ieeexplore.ieee.org/stamp/stamp.jsp?tp=&arnumber=4626817&isnumber=4626808>>, IEEE Micro, Jul.-Aug. 2008, pp. 41-50.

Boyd-Wickizer, et al., "Corey: an operating system for many cores", retrieved on Jun. 19, 2009 at <<http://www.mit.edu/~y_z/papers/corey-osdi08.pdf>>, pp. 1-14.

Burton, "16-Channel, DDR LVDS Interface with Per-Channel Alignment", retrieved on Aug. 13, 2009 at <<http://www.xilinx.com/support/documentation/application_notes/xapp855.pdf>>, Xilinx, Application Note: Virtex-5 FPGAs, XAPP855, Oct. 13, 2006, pp. 1-43.

Chandra et al, "A Case for Adapting Channel Width in Wireless Networks," In Proceedings of the ACM SIGCOMM '08 Conference on Data Communication, Aug. 17-22, 2008, Seattle, Washington, 12 pgs.

Cummings, et al., "FPGA in the Software Radio", retrieved on Jun. 19, 2009 at <<http://ieeexplore.ieee.org/stamp/stamp.jsp?tp=&arnumber=747258>>, IEEE Communications Magazine, Feb. 1999, pp. 108-112.

Dong et al., "Neural Networks Based Parallel Viterbi Decoder by Hybrid Design", Proceeding of the 5th World Congress on Intelligent Control and Automation, Jun. 15-19, 2004, pp. 1923-1926.

Dutta et al, "An Intelligent Physical Layer For Cognitive Radio Networks," Proceedings of the 4th Annual International Conference on Wireless Internet, WICON '08, Nov. 17-19, 2008, 9 pgs.

"WBX," Ettus Research LLC, retreived from <<http://www.ettus.com/WBX>> on Apr. 25, 2011, 1 pg.

"Welcome to Ettus Research," Ettus Research LLC, retrieved from <<http://www.ettus.com>> on Apr. 25, 2011, 2 pgs.

"GAO USB PC Based Oscilloscope (1Mega) Model A0130005", GAO Instruments Inc., retrieved from <<http://www.gaoinstruments.com/gao2902_usb_pc_based_oscilloscope_1mega-p-53.html>> on Aug. 13, 2009, 2 pgs.

Glossner, et al., "A Software-Defined Communications Baseband Design", retrieved on Jun. 21, 2009 at <<http://ieeexplore.ieee.org/stamp/stamp.jsp?tp=&arnumber=1166669&isnumber=26307>>, IEEE Communications Magazine, Jan. 2003, pp. 120-128.

Glossner, et al., "The Sandbridge Sandblaster Convergence Platform", Sandbridge Technologies, Feb. 2009, 21 pgs.

"GNU Radio", retrieved on Jun. 19, 2009 at <<http://www.gnu.org/software/gnuradio/>>, 2 pages.

Gockler et al, "Parallelisation of Digital Signal Processing in Uniform and Reconfigurable Filter Banks for Satellite Communications," IEEE Asia Pacific Conference on Circuits and Systems, APCCAS 2006, Dec. 4-7, 2006, 4 pgs.

Goldsmith, "Wireless Communications", retrieved on Jun. 19, 2009 at <<http://assets.cambridge.org/97805218/37163/copyright/9780521837163_copyright.pdf>>, Cambridge University Press, 2005, 2 pages.

"Host AP driver for Intersil Prism2/2.5/3, hostpad , and WPA Supplicant", retrieved on Jun. 19, 2009 at <<http://hostap.epitest.fi/>>, Mar. 23, 2009, 4 pages.

Jamieson, et al., "PPR: Partial Packet Recovery for Wireless Networks", retrieved on Jun. 19, 2009 at <<http://nms.lcs.mit.edu/papers/fp315-jamieson.pdf>>, SIGCOMM '07, ACM, Kyoto, Japan, Aug. 27-31, 2007, 12 pages.

Katti, et al., "Embracing Wireless Interference: Analog Network Coding", retrieved on Jun. 19, 2009 at <<http://nms.lcs.mit.edu/~dina/pub/anc.pdf>>, SIGCOMM '07, ACM, Kyoto, Japan, Aug. 27-31, 2007, 12 pages.

Kim et al., "Low Power, High-Rate Viterbi Decoder Employing the SST (Scarce State Transition) Scheme and Radix-4 Trellis," Department of Electrical and Computer Engineering, Sungkyunkwan University, Feb. 2000, 4 pgs.

Kim et al., "Power Efficient Viterbi Decoder based on Pre-computation Technique for Portable Digital Multimedia Broadcasting Receiver", IEEE Transactions on Consumer Electronics, vol. 53, No. 2, May 2007, pp. 350-356.

Li et al, "A Frequency Hopping Spread Spectrum Transmission Scheme for Uncoordinated Cognitive Radios," IEEE International Conference on Acoustics, Speech and Signal Processing, ICASSP 2009, Taipei, Apr. 19-24, 2009, pp. 2345-2348.

Lin, et al., "IBM Research Report Wireless Base Station Design on General Purpose Processor with Multicore Technology", retrieved on Aug. 13, 2009 at <<http://domino.watson.ibm.com/library/cyberdig.nsf/papers/B4C36233C8280F27852575FD005991DF/$File/rc24823.pdf>>, IBM Research Division, China Research Laboratory, Electrical Engineering, RC24823, Jul. 14, 2009, 9 pgs.

Lin, et al., "SODA: A Low-power Architecture for Software Radio", retrieved on Jun. 19, 2009 at <<http://ieeexplore.ieee.org/stamp/stamp.jsp?tp=&arnumber=1635943>>, Proceedings of the 33rd International Symposium on Computer Architecture (ISCA 2006), IEEE, Jun. 2006, 12 pgs.

Lin, et al., "Software Defined Radio—A High Performance Challenge", retrieved on Jun. 19, 2009 at <<http://citeseerx.ist.psu.edu/viewdoc/download?doi=10.1.1.92.7327&rep=rep1&type=pdf>>, SDRG, Sep. 2006, pp. 1-41.

Shetty, "LVDS-Based SerDes for Video Interconnects", retrieved on Aug. 17, 2009 at <<http://www.epn-online.com/page/new51279>>, EPN, Electronic Product News, pp. 1-11.

Madwifi, retrieved on Jun. 19, 2009 at <<http://sourceforge.net/projects/madwifi>>, 1 page.

Microsoft Research, "WhiteFiService Home," retrieved from <<http://whitespaces.msresearch.us>> on Apr. 25, 2011, 2 pgs.

Minden, et al., "KUAR: A Flexible Software-Defined Radio Development Platform", retrieved on Jun. 19, 2009 at <<http://www.ittc.ku.edu/publications/documents/minden2007_dyspan07.pdf>>, 2nd IEEE International Symposium on New Frontiers in Dynamic Spectrum Access Networks, Dublin, Apr. 17-20, 2007, 12 pages.

Mody et al, "Machine Learning Based Cognitive Communications in White as Well as the Gray Space," IEEE, 2007, pp. 1-7.

Narlanka et al, "A Hardware Platform for Utilizing TV Bands With a Wi-Fi Radio," 15th IEEE Workshop on Local & Metropolitan Area Networks, LANMAN 2007, New York, NY, Jun. 10-13, 2007, 5 pgs.

Neel, et al., "A Formal Methodology for Estimating the Feasible Processor Solution Space for a Software Radio", retrieved on Jun. 19, 2009 at <<http://www.sdrforum.org/pages/sdr05/1.2%20Reconfigurable%20Hardware/1.2-03%20Neel%20et%20al.pdf>>, Proceeding of the SDR 2005 Technical Conference and Product Exposition, SDR, Nov. 2005, 6 pages.

Neufeld, et al., "SoftMAC—Flexible Wireless Research Platform", retrieved on Jun. 19, 2009 at <<http://conferences.sigcomm.org/hotnets/2005/papers/grunwald.pdf>>, Department of Computer Science, University of Colorado, Boulder, Nov. 4, 2005, pp. 1-6.

Park et al, "Frequency-Domain Channel Estimation and Equalization for Continuous-Phase Modulations With Superimposed Pilot Sequences," IEEE Transactions on Vehicular Technology, vol. 58, No. 9, Nov. 2009, pp. 4903-4908.

"Part 11: Wireless LAN Medium Access Control (MAC) and Physical Layer (PHY) Specifications", retrieved on Jun. 19, 2009 at <<http://www.csse.uwa.edu.au/adhocnets/802.11-1999.pdf>>, ANSI/IEEE Std 802.11, 1999 Edition, pp. i-xiv and 1-512.

"PCI Express 2.0 Specification Released", CD Info, retrieved from <<http://www.cdrinfo.com/sections/news/Details.aspx?NewsId=19512>>, Jan. 16, 2007, 1 pg.

(56) References Cited

OTHER PUBLICATIONS

PCT International Search Report and Written Opinion for PCT Application No. PCT/US2010/049013 mailed May 13, 2011, 9 pgs.
"Radio Technology from Full Spectrum used in White Space," Radio Electronics.com, retrieved from <<http://www.radio-electronics.com/news/radio-receivers/radio-technology-from-full-spectrum-used-48>>, Sep. 22, 2010, 2 pgs.
Rahul et al, "Learning to Share: Narrowband-Friendly Wideband Networks," In Proceedings of the ACM SIGCOMM '08 Conference on Data Communication, Aug. 17-22, 2008, Seattle, Washington, 12 pgs.
"Rt2x00Wiki", retrieved on Jun. 19, 2009 at <<http://rt2x00.serialmonkey.com>>, last updated Apr. 12, 2009, 3 pages.
Savvopoulos, et al., "A Software-Radio Test-bed for Measuring the Performance of DVB-S2 Receiver Circuits", 10th International Workshop on Signal Processing for Space Communications, SPSC '08, Oct. 6-8, 2008, 7 pgs.
Sawyer, "High-Speed Data Serialization and Deserialization (840 Mb/s LVDS)", retrieved on Aug. 13, 2009 at <<http://www.eetindia.co.in/ARTICLES/2002JUN/2002JUN28_AMD_NTEK_AN.PDF?SOURCES=DOWNLOAD>>, Xilinx, Application Note: Virtex-II Family, XAPP265, Jun. 19, 2002, pp. 1-13.
Schmid, et al., "An Experimental Study of Network Performance Impact of Increased Latency in Software Defined Radios", retrieved on Jun. 19, 2009 at <<http://nesl.ee.ucla.edu/fw/thomas/wintech401-schmid.pdf>>, WiNTECH 2007, Networked and Embedded Systems Laboratory, Electrical Engineering Department, University of California, Los Angeles, Sep. 10, 2007, 8 pages.
Siu et al., "A Robust Viterbi Algorithm Against Impulsive Noise with Application to Speech Recognition", IEEE Transactions on Audio, Speech, and Language Processing, vol. 14, No. 6, Nov. 2006, pp. 2122-2133.
"Small Form Factor SDR Development Platform", retrieved on Jun. 19, 2009 at <<http://www.kanecomputing.co.uk/lyrtech_sff_sdr_dev_platform.htm>>, Kane Computing Ltd., 2 pgs.
Smirnov et al, "The Use of Spectral Analysis in Identifying Applications Runny On Enterprise Data Center Systems," CMG Computer Measurement Group, retrieved from <<http://www.cmg.org/measureit/issues/mit62/m_62_11.html>>, Aug. 2009, 6 pgs.
"Software Radio," Microsoft Research, retreived from <<http://research.microsoft.com/sora>> on Apr. 25, 2011, 3 pgs.
"Software-Defined Radio System", National Instruments, retrieved at <<http://zone.ni.com/devzone/cda/tut/p/id/8787>>, May 26, 2009, 5 pgs.
Bhatt, "Creating a PCI Express Interconnect", Intel Corporation, 2002, 8 pages.
Office action for U.S. Appl. No. 12/571,188, mailed on Oct. 25, 2012, Tan et al., "Radio Control Board for Software-Defined Radio Platform", 23 pages.
Office action for U.S. Appl. No. 12/630,774, mailed on Oct. 9, 2012, Tan et al., "High Performance Digital Signal Processing in Software Radios", 5 pages.
Office action for U.S. Appl. No. 12/535,415, mailed on Nov. 21, 2012, Tan et al., "Software-Defined Radio Using Multi-Core Processor", 14 pages.
Texas Instruments, "Texas Instruments, 10-MHz to 66-MHz, 10:1 LVDS Serializer/Deserializer", <http://www.ti.com>, Sep. 2004, 29 pages.
Suzuki et al, "Proposal of Band-Limited Divided-Spectrum Single Carrier Transmission for Dynamic Spectrum Controlled Access in ISM Band," Personal, Indoor and Mobile Radio Communications, 2009 IEEE 20th International Symposium, Sep. 3-16, 2009, pp. 132-136.
Tan, et al., "Sora: High Performance Software Radio Using General Purpose Multi-Core Processors", retrieved on Aug. 13, 2009 at <<http://www.usenix.org/event/nsdi09/tech/slides/tan.pdf>>, NSDI, 2009, pp. 1-27.
Tennenhouse, et al., "SpectrumWare—A Software-Oriented Approach to Wireless Signal Processing", retrieved at <<http://citeseerx.ist.psu.edu/viewdoc/download;jsessionid=D99E57C2A2A3CEEF89F66CBA544F774F?doi=10.1.1.17.9618&rep=rep1&type=pdf>>, Telemedia Networks and Systems Group Laboratory for Computer Science, MIT, Nov. 1995, pp. 1-15.
Agarwal et al, "The KILL Rule for Multicore", ACM, DAC 2007, San Diego, California, Jun. 4-8, 2007, pp. 750-753.
"Think Beyond the Box—A Software-Defined Approach to RF Test", National Instruments, retrieved from at <<http://zone.ni.com/devzone/cda/pub/p/id/750>>, May 13, 2009, 4 pgs.
Tsou, et al., "Latency Profiling for SCA Software Radio", retrieved at <<http://www.sdrforum.org/pages/sdr07/Proceedings/Papers/2.2/2.2-1.pdf>>, SDR Forum Technical Conference 2007, Nov. 2007, 6 pgs.
"Using Flexible-LVDS I/O Pins in APEX II Devices", retrieved at <<http://www.altera.com/literature/an/an167.pdf>>, Altera Corporation, Application Note 167, ver 1.1, Aug. 2002, pp. 1-14.
Verdu, "Multiuser Detection", retrieved on Jun. 22, 2009 at <<http://www.cambridge.org/US/catalogue/catalogue.asp?isbn=0521593735>>, Aug. 1998, 2 pages.
Wang et al, "List-Coloring Based Channel Allocation for Open-Spectrum Wireless Networks," IEEE, 2005, pp. 690-694.
"WARP: Wireless Open Access Research Platform", retrieved on Jun. 19, 2009 at <<http://warp.rice.edu/trac>>, Rice University, 2 pgs.
"Waveform Creator has Object-Oriented GUI Optimized for MIMO", Keithley Instruments, Inc., retrieved from <<http://news.thomasnet.com/fullstory/545867>>, Jun. 30, 2008, 8 pgs.
Wu, et al., "A Novel Software Radio Platform Based on General PC and Network", International Conference on Wireless Communications, Networking and Mobile Computing, WiCOM 2006, Sep. 22-24, 2006, pp. 1-4.
Yang et al, "Supporting Demanding Wireless Applications with Frequency-agile Radios," Proceedings of 7th USENIX Symposium on Networked Systems Design and Implementation (NSDI 2010), San Jose, California, Apr. 2010, pp. 1-15.
Zaki et al, "LTE Wireless Virtualization and Spectrum Management," 2010 Third Joint IFIP, Wireless and Mobile Networking Conference (WMNC), Budapest, Oct. 13-15, 2010, 6 pgs.
"The ITS Irregular Terrain Model Algorithm, NTIA, Department of Commerce.", Retrieved at http://flattop.its.bldrdoc.gov/itm.html, Retrieved Date: Dec. 24, 2009, pp. 2.
Yuan, et al., "KNOWS: Kognitiv Networking Over White Spaces", IEEE Dynamic Spectrum Access Networks (DySPAN), Apr. 2007, pp. 12.
Web page for "TV Fool", retrieved at http://www.tvfool.com, retrieved on Mar. 31, 2009, 4 pages.
Urkowitz, "Energy Detection of Unknown Deterministic Signals", Proceedings of the IEEE, vol. 55, No. 4, Apr. 1967, pp. 523-531.
Whitt, Richard., "Introducing the White Spaces Database Group", Retrieved at http:// googlepublicpolicy.blogspot.com/2009/02/introducing-white-spaces-database-group.html, Feb. 4, 2009, pp. 4.
Alocci et al., "Development of an IEEE 802.11s Simulation Model for QualNet", Dublin, Ireland, retrieved at http://www.csi.ucd.ie/Staff/jmurphy/publications/1551.pdf, Sep. 2008, 9 pages.
In the matter of Unlicense Operation in the TV Broadcase Bands, "Order Granting Extension of Time", Federal Communications Commission, released: Dec. 22, 2004, pp. 2.
Borth et al., "Considerations for Successful Cognitive Radio Systems in US TV White Space", Proceedings of the 3rd IEEE Symposium on New Frontiers in Dynamic Spectrum Access Networks, Oct. 14-17, 2008, 5 pages.
Broch et al., "A Performance Comparison of Multi-Hop Wireless Ad Hoc Network Routing Protocols", International Conference on Mobile Computing and Networking, Proceedings of the 4th annual ACM/IEEE international conference on Mobile computing and networking, Oct. 25-30, 1998, pp. 85-97.
Cabric et al., "Experimental Study of Spectrum Sensing Based on Energy Detection and Network Cooperation", Proceedings of the First International Workshop on Technology and Policy for Accessing Spectrum, Aug. 5, 2006, 8 pages.
Chandra et al., "Wireless Networking in the TV Bands", retrieved at http://sdr08.cs.ucdavis.edu/sdr-workshop.ppt, Apr. 1, 2009, 34 pages.

(56) References Cited

OTHER PUBLICATIONS

Chu, et al., "A Case for End System Multicast", Proceedings of the 2000 ACM SIGMETRICS International Conference. 28, Issue 1, Jun. 2000, pp. 1-12.

"Cognitive Radio Networks", retrieved at http://www.ece.gatech.edu/research/labs/bwn/CR/Projectdescription.html, Apr. 1, 2009, 13 pages.

Dandawate, et al., "Statistical Tests for Presence of Cyclostationarity", IEEE Transactions on Signal Processing, vol. 42, No. 9, Sep. 1994, pp. 2355-2369.

Deb et al., "Dynamic Spectrum Access in DTV Whitespaces Design Rules, Architecture and Algorithms", ACM 978-1-60558-702-8/09/09, MobiCom '09, Sep. 20-25, 2009, 12 pages.

Web page for Ettus Research LLC, "The USRP Product Family", Mountain View, California, retrieved at<<http://www.ettus.com>>, retrieved on Mar. 31, 2009, 2 pages.

Ettus Research LLC, "USRP FAQ", Mountain View, California, retrieved at <<http://www.ettus.com/faq.html>>, retrieved on Mar. 31, 2009, 7 pages.

"FCC Adopts Rule for Unlicensed Use of Television White Spaces", Retrieved at <<http:// radiomagonline.com/currents/news/fcc-adopts-rules-unlicensed-white-spaces-1105/ >>, Nov. 5, 2008, pp. 4.

FCC Media Bureau, "TVQ TV Database", Retrieved at: <<http://www.fcc.gov/mb/video/tvq. html>>, Dec. 24, 2009, 2 pages.

"FCC Acts to Expedite DTV Transition and Clarify DTV Build-Out Rules", news release from the Federal Communications Commission, Nov. 8, 2001, 3 pages.

Garroppo et al., "Notes on Implementing a IEEE 802.11s Mesh Point" retrieved at http://recerca.ac.upc.edu/eurongi08/slides/6-1-s.pdf, Apr. 1, 2009, 39 pages.

Goldsmith, Andrea Jo, "Design and Performance of High-Speed Communication Systems over Time-Varying Radio Channels", EEC S Department, University of CA, Berkeley, Technical Report No. UCB/ERL M94/75, published on Oct. 11, 2012 on 210 pages.

Gurney et al., Geo-location Database Techniques for Incumbent Protection in the TV White Space, IEEE, 978-1-4244-2017-9/08, Jun. 6, 2008, 9 pages.

"IEEE 802.22 Working Group on WRANs" web page for IEEE 802 LAN/MAN Standards Committee, retrieved at <<http://www.ieee802.org/22/>>, retrieved on Mar. 31, 2009, 2 pages.

"IEEE DySpan 2008 Dynamic Spectrum Access Networks", IEEE Symposia on New Frontiers in Dynamic Spectrum Access Networks, Oct. 14-17, 2008, 13 pages.

Jones, et al., "FCC Press Release, Evaluation of the Performance of Prototype TV-Band White Space Devices", Retrieved at << http://online.wsj.com/public/resources/documents/ fcc10152008.pdf >>, Oct. 15, 2008, pp. 149.

Katabi, Dina, "The Use of IP Anycast for Building Efficient Multicast", Proceedings in Global Telecommunications Conference, Lab. for Computer Science, vol. 3, Dec. 5-9, 1999, pp. 1679-1688.

Kim et al., "Fast Discovery of Spectrum Opportunities in Cognitive Radio Networks", Proceedings of the 3rd IEEE Symposium on New Frontiers in Dynamic Spectrum Access Networks, Oct. 14-17, 2008, 12 pages.

Kim, et al., "In-band Spectrum Sensing in Cognitive Radio Networks: Energy Detection or Feature Detection?", Proceedings of the 14th ACM international conference on Mobile computing and networking, Sep. 14-19, 2008, pp. 14-25.

Kotz, et al., "Analysis of a Campus-wide Wireless Network". In Proceedings of the Eighth Annual International Conference on Mobile Computing and Networking, MOBICOM'02, Sep. 23-26, 2002, pp. 107-118.

Liu, et al., "Sensing-based Opportunistic Channel Access", Mobile Networks and Applications, vol. 11, No. 4, Aug. 2006, pp. 1-28.

"Longley-Rice Methodology for Evaluating TV Coverage and Interference.", Retrieved at << http://www.fcc.gov/Bureaus/Engineering_Technology/Documents/bulletins/oet69/oet69 .pdf >>, Feb. 6, 2004, pp. 15.

Matinmikko, et al., "Cognitive Radio: An intelligent Wireless Communication System", Retrieved at << http://www.vtt.fi/inf/julkaisut/muut/2008/CHESS_Research_Report.pdf >>, Mar. 14, 2008, pp. 155.

Mishra et al., "How much white space is there?", Technical Report No. UCB/EECS-2009-3, Jan. 11, 2009, 16 pages.

Moscibroda et al., "Load-Aware Spectrum Distribution in Wireless LANs", IEEE International Conference on Network Protocols, Oct. 19-22, 2008, retrieved at <<http://www.ieee-icnp.org/2008/papers/Index14.pdf>>, pp. 137-146.

Nekovee, Maziar., "Quantifying the TV White Spaces Spectrum Opportunity for Cognitive Radio Access", Retrieved at << www.springerlink.com/index/p1hrw58u75027542.pdf >>, First International ICST Conference, EuropeComm, Aug. 11-13, 2009, pp. 46-57.

National Geophysical Data Center, "The Global Land One-Km Base Elevation Project (GLOBE),", Retrieved at <<http://www. ngdc.noaa.gov/mgg/topo/globe.html >>, Retrieved Date: Dec. 24, 2009, pp. 2.

NYCwireless Testimony for NY City Council Hearing: The Regulation and Use of the Unallocated Portion of the Radio Spectrum, Also Known as White Spaces, NYC Wireless New Yourk City Council Testimony on White Space, Posted on Sep. 29, 2009, 4 pages.

Office action for U.S. Appl. No. 12/535,415, mailed on Apr. 8, 2013, Tan et al., "Software-Defined Radio Using Multi-Core Processor", 26 pages.

Otsason et al., "Accurate GSM Indoor Localization", UbiComp Sep. 11-14, 2005, LNCS vol. 3660, 2005, pp. 141-158.

PCT International Search Report and Written Opinion for PCT Application No. PCT/US2011/041302, mailed Dec. 28, 2011, 9 pgs.

Plummer Jr., et al., "A Cognitive Spectrum Assignment Protocol Using Distributed Conflict Graph Construction", In Proceedings IEEE MILCOM, Oct. 2007, pp. 1-7.

Radio Magazine, "FCC Adopts Rules for Unlicensed Use of Television White Spaces", Retrieved at <<http://radiomagonline.com/currents/news/fcc-adopts-rules-unlicensed-white-spaces-1105/ >>, Nov. 5, 2008, pp. 4.

Ratnasamy et al., "Revisiting IP Multicast", ACM, 1-59593-308-5/06/0009, SigComm '06, Sep. 11-15, 2006, 12 pages.

Rix et al., "Perceptual Evaluation of Speech Quality (PESQ)—A New Method for Speech Quality Assessment of Telephone Networks and Codecs", Proceedings of the 2001 IEEE International Conference Acoustics, Speech and Signal Processing, vol. 2, May 7-11, 2001, 4 pages.

"Rosum Corporation", Retrieved at http://rosum.com/, Retrieved Date: Dec. 24, 2009, pp. 1.

Sahai et al., Spectrum Sensing Fundamental Limits and Practical Challenges, IEEE Symposium on New Frontiers in Dynamic Spectrum Access Networks, Nov. 8-11, 2005 138 pages.

Web page for Scalable Network Technologies, Inc., Los Angeles, California, retrieved at http://www.scalable-networks.com, retrieved on Mar. 31, 2009, 1 page.

Shellhammer et al., "Technical Challenges for Cognitive Radio in the TV White Space Spectrum", ITA Conference, San Diego, CA, Feb. 8-13, 2009, 11 pages.

Sprectrum Bridge, "Show My White Space", Retrieved at http://showmywhitespace.com/, Retrieved on Dec. 24, 2009, pp. 2.

"Shuttle Radar Topography Mission (SRTM)", Retrieved at http://www2.jpl.nasa.gov/srtm/, Retrieved Date: Dec. 24, 2009, pp. 2.

"Skyhook Wireless", Retrieved at http://skyhookwireless.com/, Retrieved Date: Dec. 24, 2009, pp. 6.

Stirling, "White Spaces—the New Wi-Fi?", International Journal of Digital Television, vol. 1, No. 1, Feb. 2010, pp. 16.

Subramani, et al., "Spectrum Scanning and Reserve Channel Methods for Link Maintenance in Cognitive Radio Systems", Proceedings of the 67th IEEE Vehicular Technology Conference, VTC, May 11-14, 2008, pp. 1944-1948.

Tandra et al., "SNR Wall for Signal Detection", IEEE Journal of Selected Topics in Signal Processing, vol. 2, No. 1, Feb. 2008, pp. 4-17.

8b/10b encoding, accessed on Apr. 21, 2011 <http://en.wikipedia.org/wiki/8b/10B>, 9 pages.

Ethernet Frame, accessed on Apr. 21, 2011, <http://en.wikipedia.org/wiki/Ethernet_frame>, 6 pages.

(56) References Cited

OTHER PUBLICATIONS

Final Office Action for U.S. Appl. No. 12/473,963, mailed on May 1, 2012, Ranveer Chandra, "Spectrum Assignment for Networks Over White Spaces and Other Portions of the Spectrum", 14 pgs.
"Low-Voltage differential signaling", accessed on Apr. 21, 2011 <http://en.wikipedia.org/wiki/Low-voltage_differential_signaling>, 7 pages.
Ma, "A Closter Look at LVDS Technology" Pericom, Apnote 41, Nov. 16, 2001. 3 pages.
Office Action for U.S. Appl. No. 12/631,548, mailed on Jan. 10, 2012, Kun Tan, "Analyzing Wireless Technologies Based On Software-Defined Radio", 8 pgs.
Office Action for U.S. Appl. No. 12/473,963, mailed on Nov. 9, 2011, Ranveer Chandra, "Spectrum Assignment for Networks Over White Spaces and Other Portions of the Spectrum", 12 pgs.
Office Action for U.S. Appl. No. 12/535,415, mailed on Apr. 11, 2012, Kun Tan, "Software-Defined Radio Using Multi-Core Processor", 15 pgs.
Office Action for U.S. Appl. No. 12/630,774, mailed on Apr. 12, 2012, Kun Tan, "High Performance Digital Signal Processing in Software Radios", 9 pgs.
Office action for U.S. Appl. No. 12/571,188, mailed on Jun. 6, 2012, Tan et al., "Radio Control Board for Software-Defined Radio Platform", 18pages.
Office action for U.S. Appl. No. 12/631,548, mailed on Jul. 2, 2012, Tan et al., "Analyzing Wireless Technologies Based On Software-Defined Radio", 7 pages.
PCT International Search Report and Written Opinion for PCT Application No. PCT/US2010/036752 mailed May 13, 2011, 9 pgs.
PCT International Search Report and Written Opinion for PCT Application No. PCT/US2010/036756 mailed May 13, 2011, 9 pgs.
System Packet Interface Level 4 (SPI-4) Phase 2 Revision 1: OC-192 System Interface for Physical and Link Layer Devices, Optical Internetworkig Forum, Oct. 15, 2003, 72 pages.
Office action for U.S. Appl. No. 12/571,188, mailed on Jan. 14, 2014, Tan, et al., "Radio Control Board for Software-Defined Radio Platform", 23 pages.
Chinese Notice on the First Office Action for CN Application No. 201080024631.7, mailed on Nov. 27, 2013, a counterpart foreign application of U.S. Appl. No. 12/473,951, 12 pgs.
Chinese Notice on the First Office Action for CN Application No. 201080024619.6, mailed on Dec. 10, 2013, a counterpart foreign application of U.S. Appl. No. 12/473,963, 13 pgs.
Chinese Office Action mailed May 22, 2014 for Chinese patent application No. 201080043940.9, a counterpart foreign application of U.S. Appl. No. 12/571,188, 15 pages.
Extended EP Search Report for EP Application No. EP10781356.0, dated Nov. 20, 2013, a counterpart foreign application of U.S. Appl. No. 12/473,963, 6 pgs.
Extended EP Search Report for EP Application No. EP11798778 .4, dated Nov. 25, 2013, a counterpart foreign application of U.S. Appl. No. 12/822,218, 7 pgs.
Intel, "Differential Signaling", Introduction Reading Chapter 6, 2002, 69 pages.
Japanese Notice of Rejection for Japanese Application No. 2012-513340 mailed on Mar. 26, 2014, a counterpart foreign application of U.S. Appl. No. 12/473,963, 7 pgs.
Japanese Office Action for Japanese Application No. 2012-513342, mailed on Apr. 30, 2014, a counterpart foreign application of U.S. Appl. No. 12/473,963, 4 pgs.
Na et al, "Policy-based Dynamic Channel Selection Architecture for Cognitive Radio Networks," Communications and Networking in China, 2007, CHINACOMM '07, Aug 22-24, 2007, 5 pgs.
Office action for U.S. Appl. No. 12/571,188, mailed on May 28, 2014, Tan et al., "Radio Control Board for SoftwareDefined Radio Platform", 30 pages.
PCT Search Report and Written Opinon for PCT/US2012/064249 mailed Mar. 29, 2013, 10 pages.

Stevenson et al (posted by Peter Murray), "TV Whitespace Petition for Reconsideration Input from 802.22 to 802.18," IEEE P802.22, Jan. 2009, pp. 1-10.
Aguayo, et al, "Link-level Measurements from an 802.11b Mesh Network," SIGCOMM '04, Portland, Oregon, Aug. 2004, 11 pages.
Bahl, et al, "Cell Breathing in Wireless LANs: Algorithms and Evaluation," IEEE Computer Society, Transactions on Mobile Computing, Feb. 2007 (vol. 6 Issue 2), 16 pages.
Balazinska, et al, "Characterizing Mobility and Network Usage in a Corporate Wireless Local-Area Network," Proceedings of the First Internation Conference on Mobile Systems, Applications and Services; San Francisco, CA, May 2003, 14 pages.
Bejerano, et al, "Fairness and Load Balancing in Wireless LANs Using Association Control," MobiCom'04, Sep. 2004, Philidelpia, Pennsylvania, 15 pages.
Bruno, "High-Speed Wireless LANs: The Impact of Atheros Super G Proprietary Performance Mode on 802.11g Devices," The Tolly Group White Paper, Aug. 2004, 11 pages.
Camp, et al., "Measurement Driven Deployment of a Two-Tier Urban Mesh Access Network," MobiSys 06, Uppsala, Sweden, Jun. 2006, 14 pages.
Delay Spread, JPL's Wireless Communication Reference Website. Last accessed May 1, 2008, 4 pages.
Do-Hyun Na, et al., "Policy Based Dynamic Channel Selection Architecture for Cognitive Radio Networks, Communications and Networking in China," Aug. 2007, pp. 1190-1194.
ElBatt, et al., "Power Management for Throughput Enhancement in Wireless Ad-Hoc Networks," <<http://cs.ucr.edu/~kris/icc1hri.pdf. Last accessed May 1, 2008, 9 pages.
"Building Software Radio Systems: The USRP Product Family," Ettus Research LLC, Mountain View, California, retrieved at <<http://www.ettus.com>>, retrieved on Aug. 8, 2009, 2 pages.
Gast, "802.11 Wireless Networks. The Definitive Guide," Second Edition, Apr. 2002, 436 pages.
Geier, "Enabling Fast Wireless Networks with OFDM." CommsDesign, Feb. 2001, 6 pages.
Ghosh, et al., "A Cognitive Radio Prototype Operating in UHF TV Bands," IEEE Symposia on New Frontiers in Dynamic Spectrum Access, Networks, Demonstrations and Experimentation, IEEE DySPAN 2008, Oct. 2008, retrieved at <<http://cms.comsoc.org/SitGen/Uploads/Public/Docs_DYSPAN_2008/Phillips_Demo_IEEDySPAN2008. pdf>>, 4 pages.
Gummadi, et al, "Understanding and Mitigating the Impact of RF Interference on 802.11 Networks," SIGCOMM Proceedings of the 2007 Conference on Applications, Technologies, Architectures, and Protocols for Computer Communications; vol. 37, Issue 4, Oct. 2007; 14 pages.
Heusse, et al., "Performance of Anomaly of 802.11b," Proceedings of INFOCOM 2003, Mar. 2003, 8 pages.
Holland, et al, "A Rate-Adaptive MAC Protocol for Multi-Hop Wireless Networks," IEEE International Conference on Mobile Computing and Networking (MOBICOM'01), Rome, Italy, Jul. 2001, 15 pages.
Horowitz, "The Art of Electronics, 2nd Edition," Cambridge University Press, Jul. 28, 1989, 469 pages.
International Search Report for Application No. PCT/US2010/036752 (corresponding to U.S. Appl. No. 12/473,951), mailed on Dec. 31, 2010, 9 pages.
International Search Report for Application No. PCT/US2010/036756 (corresponding to U.S. Appl. No. 12/473,963), mailed on Dec. 29, 2010, 9 pages.
JP Notice of Rejection for Application No. 2012-513340, Mar. 26, 2013, 7 pages.
Judd, et al, "Using Emulation to Understand and Improve Wireless Networks and Applications," NSD0I 2005 Proceedings of the 2nd Conference on Symposium on Networked Systems Design & Implementation—vol. 2, May 2005, 14 pages.
Kamerman, "WaveLan-II: A High-Performance Wireless LAN for the Unlicensed Band." Bell Labs Technical Journal, Aug. 1997. 16 pages.
Lacage, et al., "IEEE 802.11 Rate Adaptation: A Practical Approach," MSWiM '04, Venezia, Italy, Oct. 2004, 9 pages.

(56) References Cited

OTHER PUBLICATIONS

Mishra, Mobi-Com Poster Abstract: Client-driven Channel Management for Wireless LANs, Mobile Computing and Communications Review, vol. 10, No. 4, Oct. 2006, pp. 8-10.

Mishra, "Weighted Coloring Based Channel Assignment in WLANs," Mobile Computing and Communications Review, Jul. 2005, 12 pages.

Office Action dated Dec. 10, 2013 in China Patent Application CN201080024619.6, filed May 28, 2010, by Applicant Microsoft Corporation, translated, 13 pages.

Ogilvie, "Clock Solutions for Wi-Fi" (IEEE 802.11), Perocom Semiconductor; www.pericom.com/pdf/applications/AN070.pdf; Sep. 5, 2003, 4 pages.

Proakis, "Digital Communications," McGraw Hill, Aug. 2000, 937 pages.

Rules 70(2) and 70a(2) EPC Communication and Supplemental European Search Report dated Dec. 6, 2013 in EPO Patent Application 10781356.0 (PCT/US2010/036756) filed May 28, 2010, by Applicant Microsoft Corporation, 7 pages.

Shah, et al., "Dynamic Bandwidth Management for Single-hop Ad Hoc Wireless Networks," Mobile Networks and Applications, Mar. 2005, 9 pages.

Shih, et al, "Wake on Wireless: An Event Driven Energy Saving Strategy for Battery operated Devices," MobiCom '02, Proceedings of the 8th annual international conference on Mobile Computing and networking, Sep. 2002, 12 pages.

"SLX Wireless Systems Specifications," SHURE Incorporated, Niles, Illinois, retrieved at <<http://www.fullcompass.com/common/files/3227-SLX-Series%20Shure%20specs.pdf>>retreived on Aug. 8, 2009, 3 pages.

Tang, et al, "Analysis of a Local-Area Wireless Network," MobiCom '00; Proceedings of the 6th Annual International Conference on Mobile Computing and Networking, Boston, Massachusetts, Aug. 2000, 10 pages.

Trachewsky, et al, "Broadcom WLAN Chipset for 802.11a/b/g," Broadcom Corporation, CA, USA, Aug. 17, 2003, 42 pages.

"USRP—Frequently Asked Questions," GNU Radio, the GNU Software Radio, retrieved at <<http://gnuradio.org/trac/wiki/UsrpFAQ>>, retrieved on Aug. 8, 2009, 1 page.

Weiser, et al., "Scheduling for Reduced CPU Energy," OSDI '94 Proceedings of the 1st USENIX Conference on Operating Systems Design and Implementation, Nov. 1994, 11 pages.

WiMax Forum. www.wimaxforum.org. Last accessed May 1, 2008 2 pages.

Wormsbecker, "On Channel Selection Strategies for Multi-Channel MAC Protocols in Wireless Ad Hoc Networks," IEEE International Conference on Wireless and Mobile Computing, Networking and Communications, Jun. 2006, pp. 212-220.

Yuan, et al, "Allocationg Dynamic Time-Spectrum Blocks in Cognitive Radio Networks," 8th ACM International Symposium on Mobile ad hoc networking and computing, Montreal, Quebec, Canada, Sep. 2007, 10 pages.

Chinese Notice on the Second Office Action for CN Application No. 201080024631.7, mailed on Jul. 11, 2014, a counterpart foreign application of U.S. Appl. No. 12/473,951, 8 pgs.

Chinese Notice on the Second Office Action for CN Application No. 201080024619.6, mailed on Aug. 14, 2014, a counterpart foreign application of U.S. Appl. No. 12/473,963, 7 pgs.

Office Action for U.S. Appl. No. 13/294,039, mailed on Oct. 16, 2014, He et al., "Mapping Signals from a Virtual Frequency Band to Physical Frequency Bands", 11 pages.

Japanese Notice of Rejection for Japanese Application No. 2013-516700 mailed on Sep. 30, 2014, a counterpart foreign application of U.S. Appl. No. 12/822,218, 4 pgs.

Chinese Office Action mailed Jan. 7, 2015 for Chinese patent application No. 201080043940.9, a counterpart foreign application of U.S. Appl. No. 13/202,297, 7 pages.

Japanese Office Action mailed Nov. 25, 2014 for Japanese patent application No. 2014-508666, a counterpart foreign application of U.S. Appl. No. 13/202,297, 7 pages.

\* cited by examiner

MAPPING A TRANSMISSION STREAM IN A VIRTUAL BASEBAND TO A PHYSICAL BASEBAND WITH EQUALIZATION

RELATED APPLICATIONS

The present application is related to U.S. patent application Ser. No. 13/202,297, filed on Aug. 18, 2011, which is a national stage entry application from PCT Application PCT/CN2011/073647, filed on May 4, 2011.

The present application is related to U.S. patent application Ser. No. 13/294,039, concurrently filed, and entitled "MAPPING SIGNALS FROM A VIRTUAL FREQUENCY BAND TO PHYSICAL FREQUENCY BANDS".

BACKGROUND

White space frequency bands are frequency bands allocated to television (TV) broadcasting service and to wireless microphone service, but not used in a local geographic area. Recent Federal Communication Commission (FCC) rules allow unlicensed access to white space frequency bands in the United States as long as such access does not interfere with TV and wireless microphone transmission (i.e., "incumbent" or "primary user" access to the frequency bands). Non-U.S. jurisdictions may also in the future implement similar provisions for access to television frequency bands. Available white space frequency bands may have variable bandwidths, and they may be non-contiguous and location-specific. These aspects make white space transmission networks different from conventional wireless transmission networks.

Conventional media access control and physical layer protocols may not support variable and non-contiguous frequency transmission as is typically needed in order to transmit over white space frequency bands. Conventional approaches to adapting a signal to an available spectrum include SampleWidth, SWIFT, and Jello. SampleWidth changes the bandwidth of a signal by adjusting the ticking rate of the baseband clock, which is equivalent to changing the signal's sampling rate. SWIFT and Jello split an orthogonal frequency-divisional signal into non-contiguous spectrum bands.

BRIEF SUMMARY

This Summary is provided in order to introduce simplified concepts of signal mapping and reshaping, which are further described below in the Detailed Description. This summary is not intended to identify essential features of the claimed subject matter, nor is it intended for use in determining the scope of the claimed subject matter.

In embodiments, a wireless device includes a spectrum virtualization layer that reshapes a transmission stream generated by a physical layer protocol for transmission in a virtual baseband into transmission symbols for transmission on one or more non-contiguous and/or variable allocated portions of a physical baseband. In the transmission path, the reshaping process includes a mapping of transmission components associated with the transmission stream to sub-carriers of the allocated portions of a physical baseband, and an inverse fast Fourier transform of the mapped transmission components to produce time-domain samples in the physical frequency band. A cyclic prefix is appended to the time-domain samples to produce a transmission symbol, which is then transmitted by a radio front-end. The spectrum virtualization layer also performs bandwidth adjustment, sampling rate adjustment, and frequency shift operations to allow the reshaped signals to be transmitted by a radio front-end on the physical baseband.

In the reception path, the spectrum virtualization layer performs frequency shift, bandwidth adjustment, and sampling rate operations on the received signal. The spectrum virtualization identifies a reception symbol, performs a transform on the time-domain samples of the reception symbol to produce frequency components (i.e., "reception components"), and equalizes the transformed reception components to compensate for signal distortion caused by the reshaping processes. The compensated components of the reception symbol are mapped to sub-carriers of the virtual baseband and passed to the physical layer protocol.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
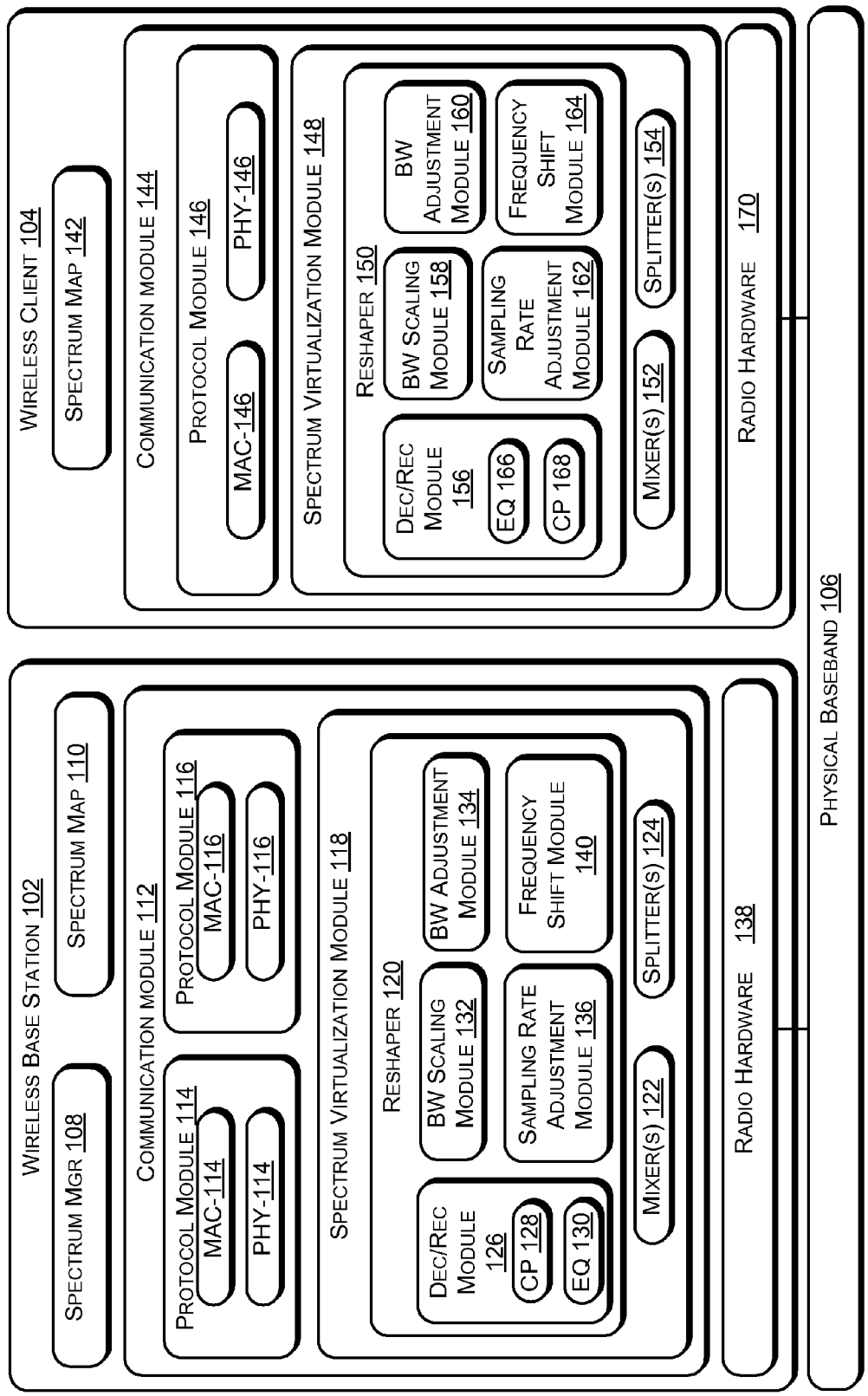
FIG. 1 is a schematic diagram of an example environment usable to reshape signals from a virtual baseband to a physical frequency band.

As discussed above, white space frequency bands may have variable bandwidths, and they may be non-contiguous and location-specific. A wireless device according to embodiments of the present disclosure utilizes conventional media access control (MAC) and physical layer (PHY) protocols (such as in Wi-Fi®, protocols within the 802.11 suite of protocols, code division multiple access (CDMA) based protocols, carrier sense multiple access (CSMA) based protocols, time division multiple access (TDMA) based protocols, others, and combinations thereof) to communicate over white space frequency bands. The ability to use conventional MAC and PHY protocols may speed the adoption of white space frequency networking, especially if those conventional protocols do not need to be changed by a lengthy standards-setting process. But conventional MAC and PHY protocols may not support variable or non-contiguous frequency transmissions as is required in white space networking, and conventional MAC and PHY protocols may set forth requirements for transmissions on specific frequency bands that differ from the white space frequency bands that happen to be available in a particular geographic area. Embodiments of the present disclosure include devices and methods for enabling conventional MAC and PHY layer protocols to utilize non-contiguous and variable frequency bands.

Embodiments of the present disclosure include a signal reshaper within a spectrum virtualization layer. Conceptually, the spectrum virtualization layer sits beneath the PHY layer (referring to, for example, the Physical (PHY) layer of the seven-layer Open Standards Interface (OSI) model). The spectrum virtualization layer is configured to, among other things, reshape transmission streams that have been generated in accordance with conventional or non-conventional MAC and PHY protocols (i.e., data streams that are in a fixed and contiguous baseband or frequency band specified by those protocols) into signals for radio transmission on the variable and/or non-contiguous available physical frequency bands (i.e., signals that are in one or more white space frequency bands). Frequency bands specified by conventional or non-conventional MAC and PHY protocols are hereinafter referred to as a "virtual baseband" or a "virtual frequency band." Reshaping performed by the spectrum virtualization layer is transparent to the MAC and PHY protocols. Transparent reshaping allows signals generated by the MAC and PHY protocols to be transmitted on variable frequency bands without altering the MAC and PHY protocols, thereby potentially speeding adoption of white space networking.

A spectrum virtualization module according to embodiments includes a reshaper module. The reshaper module performs signal decomposition/recomposition, bandwidth adjustment, sample rate adjustment, and frequency shifting on transmitted and received signals in order to utilize the available white space frequency bands. Decomposition of a transmitted signal includes mapping transmission components associated with the transmission stream to subcarriers within the allocated physical frequency bands (such as white space frequency bands), and inverse transforming the mapped components into a time-domain samples for transmission. A cyclic prefix is appended to the time-domain samples to generate a transmission symbol. The transmission symbol is passed to a radio front-end for transmission on the physical frequency band.

Recomposition of a received signal includes identifying a reception symbol, transforming time-domain samples of the reception symbol to produce frequency components of the received signal, equalizing the frequency components to compensate for signal distortion caused by the reshaping operations, multipath fading, and channel attenuation. The recomposition also includes mapping the compensated components to sub-carriers of the virtual baseband. The recomposed samples are passed to the upper layer PHY and MAC protocols for further processing according to those protocols. Because the equalizer compensates for signal distortion, the spectrum virtualization layer can be viewed as a channel wrapper which abstracts the underlying wireless channel as an identity channel that generates output identical to input. In the view of the upper PHY layer, its signal goes through a perfect (identity) channel without fading and attenuation.

The spectrum virtualization layer employs bandwidth adjustment if the virtual baseband bandwidth does not equal the aggregate bandwidth of the allocated white space frequency bands. In such cases, the spectrum virtualization layer uses a scaling factor to artificially increase the size of the physical frequency bands so that their aggregate bandwidth is equal to the bandwidth of the virtual baseband. This aspect of bandwidth adjustment is performed in conjunction with the decomposition/recomposition process, and the mapping process maps the frequency components to sub-carriers of the artificially scaled physical frequency bands. Then, after a time-domain signal is produced by the decomposition/recomposition process, the signal bandwidth is reduced by the same factor that was used to artificially increase the size of the physical frequency bands. This reduction includes interpolation, low-pass filtering, and decimation. At the receiver side, the spectrum virtualization layer performs reverse bandwidth scaling and adjustment operations.

Sampling rate adjustment by the spectrum virtualization layer adjusts the sampling rate of the transmit signal to match the sampling rate of the radio front-end used by a wireless device. Similar to the process of bandwidth adjustment, the spectrum virtualization layer uses interpolation and decimation to adjust the sampling rate. At the receiver side, the spectrum virtualization layer performs reverse operations to adjust the sampling rate of the received signal to match the sampling rate of the virtual baseband.

Frequency shifting compensates for an artificial frequency shift that occurs during the mapping portion of the decomposition/recomposition process. During frequency shifting, the spectrum virtualization layer shifts the signal frequencies to match the allocated white space frequency ranges so that the transmission signals can be transmitted on the physical baseband. At the receiver side, the spectrum virtualization layer artificially shifts the signal frequencies back before the received signals are recomposed by the reshaper.

Although various embodiments may be described herein as being related to "white space" transmissions, "white space" networks, "white space" base stations, and "white space" clients, embodiments of the present disclosure are not limited to white space environments. Rather, embodiments include transmissions, networks, base stations, environments, and clients that are usable and/or compatible with any of various Dynamic Spectrum Access (DSA) networks. Embodiments refer to "white space" networking for the sake of discussion, and such references should not be taken in a limiting way.

The processes, systems, and devices described herein may be implemented in a number of ways. Example implementations are provided below with reference to the following figures.

Example Environment for Frequency Allocation

FIG. 1 is a schematic diagram of an example environment usable to reshape and transmit signals generated from a virtual baseband to a physical frequency band. The environment 100 may include a wireless base station 102 and a wireless client 104. The wireless base station 102 may be implemented on various suitable computing device types that are capable of implementing a wireless base station. Suitable computing device or devices may include, or be part of, one or more personal computers, servers, server farms, datacenters, special purpose computers, combinations of these, or any other computing device(s) capable of storing and executing all or part of a wireless base station.

In addition, the wireless client 104 may also be implemented on various suitable computing device types that are capable of implementing a wireless client. Suitable computing device or devices may include, or be part of, one or more personal computers, servers, server farms, datacenters, special purpose computers, combinations of these, or any other computing device(s) capable of storing and executing all or part of a wireless client.

The physical baseband 106 is a wireless frequency range or ranges that the wireless client 104 and the wireless base station 102 may use to communicate with one another. These frequency ranges may include, for example, white space frequency ranges. The wireless base station 102 and the wireless client 104 may be coupled to each other through the physical baseband 106 using various communication connections and protocols.

In the illustrative example of FIG. 1, the wireless base station 102 includes a spectrum manager 108. The spectrum manager 108 determines an allocation of white space or other physical frequency ranges of the physical baseband 106 that are available for use in a local geographic area of the wireless base station 102 and the wireless client 104. The spectrum manager 108 may be configured, for example, to communicate with a white space finder service (not shown) and to receive from the white space finder service an allocation of physical frequency ranges of the physical baseband 106 for use in the local geographic area. The spectrum manager 108 contains one or more policies such as regulatory policies or transmission requirements, and the spectrum manager 108 may select from the allocated physical frequency ranges based on these policies. Non-limiting examples of regulatory policies include guard bands requirements, power mask requirements, times that white space frequency bands are available, acceptable transmission power level ranges, and so forth. In another example, the spectrum manager 108 may be configured to determine locally available white space frequencies and to select one or more for transmission according to various policies. See PCT Application PCT/CN2011/073647, filed on May 4, 2011, for examples of a spectrum manger and a white space finder service. The spectrum manager 108 builds and maintains a spectrum map 110, based on the availability of physical frequency bands in the local geographic area. The spectrum map 110 includes a mapping of virtual frequency bands to physical frequency bands.

The wireless base station 102 includes a communication module 112. The communication module 112 includes various protocol modules, such as the protocol modules 114 and 116. The protocol modules 114 and 116 implement the media access control protocols MAC-114 and MAC-116 and the physical layer protocols PHY-114 and PHY-116. The MAC-114 may be different from or the same as the MAC-116, and the PHY-114 may be different from or the same as the PHY-116. The protocol modules 114 and 116 may implement conventional wireless protocols such as in Wi-Fi®, protocols within the 802.11 suite of protocols, code division multiple access (CDMA) based protocols, carrier sense multiple access (CSMA) based protocols, time division multiple access (TDMA) based protocols, others, and combinations thereof. Such conventional wireless protocols may be designed to transmit and receive on specific frequency ranges set forth by those protocols. These specific frequency ranges are referred to herein as virtual frequency ranges, or virtual basebands. Communication modules according to embodiments may include more or fewer protocol modules than is shown in FIG. 1.

The communication module 112 includes a spectrum virtualization module 118. The spectrum virtualization module 118 includes a reshaper 120, mixer(s) 122, and splitter(s) 124. The reshaper 120 includes a decomposition/recomposition module 126 configured to, among other things, map received and transmitted symbols between the virtual baseband and physical baseband 106 according to spectrum map 110. The decomposition/recomposition module 126 is configured to produce frequency components of the time-domain transmission symbol produced by the protocol modules 114 and 116. The decomposition/recomposition module 126 is configured to accept a transmission stream from one of the protocol module 114 or the protocol module 116. Such a transmission stream is produced by the upper layer protocols for transmission on the virtual baseband according to the upper layer protocols. The decomposition/recomposition module 126 is configured to map or reassign components associated with the transmission stream to sub-carriers of the allocated physical frequency bands of the physical baseband 106, and perform an N-point inverse fast Fourier transform (iFFT) on the mapped components to produce time-domain samples for transmission. A cyclic prefix (CP) module 128 is configured to append a cyclic prefix to the time domain samples to produce a transmission symbol.

In a two-tier reshaping embodiment, an M-point fast Fourier transform (FFT) is performed on the samples of the transmission stream to produce a plurality of frequency components of the transmission stream. In the two-tier reshaping embodiment, it is the plurality of frequency components from the M-point FFT that are mapped or reassigned to sub-carriers of the one or more allocated portions of the physical baseband. Thus, the mapped components are frequency components of the transmission stream samples. In a one-tier reshaping embodiment, the time-domain samples of the transmission stream are treated as frequency components and directly mapped to the sub-carriers of the physical baseband. Since both time-domain and frequency samples are expressed as complexes, the time-domain components can be treated the same as frequency components, and the time-domain samples can be directly mapped to sub-carriers of the physical baseband as if they were frequency components. The two-tier reshaper embodiment results in higher computational overhead than does the one-tier reshaper embodiment. But the two-tier embodiment results in lower peak-to-average-power-ratio (PAPR) than does the one-tier embodiment. Lower PAPR is beneficial for transmission on the RF front-end.

Upon receipt of a signal (such as from the wireless client 104 over the physical baseband 106), the decomposition/recomposition module 126 is configured to identify a reception symbol, strip the cyclic prefix from the reception symbol, and to perform an N-point FFT on the reception symbol to produce N transform components. Equalization (EQ) module 130 is configured to equalize the N transform components to compensate for signal distortion introduced by the reshaping operations, multipath fading, and channel attenuation. The decomposition/recomposition module 126 is configured to map M of the resulting N compensated components that correspond to allocated portions of the physical baseband 106 to sub-carriers of the virtual baseband. In a two-tier embodiment, the mapped M compensated components are passed to a M-point iFFT to produce M time-domain samples which are then passed to the appropriate PHY layer, such as those in the protocol modules 114 and 116. In a one-tier embodiment, the mapped M compensated components are passed directly to the appropriate PHY layer without first undergoing an iFFT. Since both time-domain and frequency samples are expressed as complexes, the time-domain and the frequency-domain components can be processed using similar mathematics, and the time-domain samples can be directly mapped to sub-carriers of the physical baseband. The protocol modules 114 and 116 will treat these frequency-domain components as time-domain samples of a reception stream. More details regarding the operation of the components of the decomposition/recomposition module 126 are described elsewhere within this Detailed Description.

The bandwidth scaling module 132 is configured to determine whether the bandwidth of the virtual baseband differs from the aggregate bandwidth of the allocated physical frequency bands of the physical baseband 106. If a difference in the bandwidths is determined, then the bandwidth scaling module 132 artificially scales the allocated physical frequency bands such that their aggregate bandwidth equals the bandwidth of the virtual baseband. In a two-tier embodiment, the decomposition/recomposition module 126 maps the M frequency components that result from the transformed time-domain transmission symbol to sub-carriers of the scaled allocated physical frequency bands. In a one-tier embodiment, the time-domain components from the PHY layer are mapped directly to the scaled allocated physical frequency bands. If the ratio of the aggregate bandwidth of the one or more allocated portions of the physical baseband is 1:1, then no scaling is necessary, and the decomposition/recomposition module 126 maps the M frequency components or time-domain components to sub-carriers of the un-scaled frequency bands. Upon receipt of a receive signal, the bandwidth scaling module 132 performs reverse scaling operations upon a determination that the aggregate bandwidth of the allocated physical frequency bands is not equal to the bandwidth of the virtual baseband. More details regarding the operations of the bandwidth scaling module 132 are described elsewhere within this Detailed Description.

Because the scaled allocated portions of the physical band 106 do not match the actual allocated portions of the physical baseband 106, the bandwidth adjustment module 134 is configured to adjust the bandwidth of the transmission signal produced by the decomposition/recomposition module 126 to match the actual physical frequency ranges of the physical baseband 106. Thus, the bandwidth adjustment module 134 does not perform bandwidth adjustment unless the aggregate bandwidth of the allocated physical frequency bands of the physical baseband 106 is not equal to the bandwidth of the virtual baseband.

As will be described in more detail elsewhere within this Detailed Description, the bandwidth adjustment module 134 utilizes interpolation, low-pass filtering, and decimation to perform bandwidth adjustment. Upon receiving a signal, the bandwidth adjustment module 134 performs reverse operations to reconstruct the transmission signal produced by the decomposition/recomposition module of the transmitter (such as the wireless client 104, which is described in more detail below).

The sampling rate adjustment module 136 is configured to adjust the sampling rate of the transmission signal produced by the reshaper 120 to match the sampling rate of the radio hardware 138. As will be described in more detail elsewhere within this Detailed Description, the sampling rate adjustment module 136 utilizes interpolation and decimation to re-sample the bandwidth-adjusted time-domain transmission signal. Upon receipt of a signal, the sampling rate adjustment module 136 performs reverse operations to adjust the sampling rate of the received signal to match the sampling rate of the virtual baseband. Upon receipt of a receive signal from another wireless device, the frequency shift module 136 shifts the frequencies of the receive signal by amount equal to the central frequency spectrum of the span. More details on the operations of the frequency shift module 136 are included elsewhere within this Detailed Description.

The frequency shift module 140 is configured to compensate for a frequency shift that occurs during the mapping operation in the decomposition/recomposition module 126. As will be described in more detail elsewhere within this Detailed Description, the frequency shift module 140 shifts the frequency of the transmission signal by an amount equal to the center frequency of the span of allocated physical bands. Upon receipt of a receive signal from another wireless device, the frequency shift module 140 shifts the frequencies of the receive signal by amount equal to the central frequency spectrum of the span. More details on the operations of the frequency shift module 140 operations are provided elsewhere within this Detailed Description.

Even though only one reshaper is shown in FIG. 1, communication modules, such as communication module 112, may include multiple reshapers. These reshapers may be configured to accept transmission signals from various ones of the protocol modules 114 and 116, and to map them to physical frequency ranges allocated to those protocol modules according to the spectrum map 110. Where multiple reshapers are utilized, the mixer(s) 122 mix the various reshaped signals from those multiple reshapers prior to passing them to the radio hardware 138. Also, the splitter(s) 124 split and pass multiple reception signals from the incoming signal stream to the appropriate reshapers for signal recomposition during signal reception.

The wireless client 104 includes a spectrum map 142, which mirrors at least a portion of the spectrum map 110 in the wireless base station 102. The wireless base station 102 may communicate with multiple wireless clients on various portions of the physical baseband 106, and spectrum map 142 may only define mapping for those physical frequency bands allocated for transmission to and from the wireless client 104.

The wireless client 104 includes a communication module 144, which includes a protocol module 146. The protocol module 146 includes MAC-146 and PHY-146 protocols. The protocol module 146 may include a conventional or non-conventional protocol stack, configured to transmit on a virtual baseband. The protocol module 146 corresponds to one of the protocol modules 114 and 116 in the wireless base station 102. The spectrum virtualization module 148 includes a reshaper 150, mixer(s) 152, and splitter(s) 154. The reshaper 150 includes a decomposition/recomposition module 156, a bandwidth scaling module 158, a bandwidth adjustment module 160, a sampling rate adjustment module 162, and a frequency shift module 164. Decomposition/recomposition module 156 includes equalization module 166 and cyclic prefix module 168. Various aspects of the spectrum virtualization module 148 are the same or similar to various aspects of the spectrum virtualization module 118 of the wireless base station 102. The radio hardware 170 is operatively coupled to the mixer(s) 152 and the splitter(s) 154, and is configured to transmit and receive signals via the physical baseband 106.

The spectrum virtualization modules 118 and 148 operate together to allow conventional wireless protocols to communicate over allocated physical bands within the physical baseband 106 without modification to the conventional wireless protocols. The transparent reshaping of wireless signals may spur adoption of white space frequency transmission by enabling conventional (or non-conventional) protocols to utilize white space networking without the need to make changes to those conventional (or non-conventional) protocols, or the need to adopt new wireless protocols that are capable of utilizing non-contiguous and variable frequency bands.

Furthermore, the cyclic prefix modules 128 and 168, as well as the equalization modules 130 and 166, allow spectrum virtualization modules 118 and 148 to reshape virtual baseband signals with little or no knowledge of the PHY layer protocol details. For example, there is no need for reshapers 120 and 150 to have access to the number of sub-carriers in the virtual baseband, the modulation details of the PHY layer protocols, or the symbol lengths used by the PHY layer protocols. This decoupling of the spectrum virtualization modules 118 and 148 from the PHY layer details renders them "agnostic" to the PHY layer protocols.

Example Wireless Device

Figure 2:
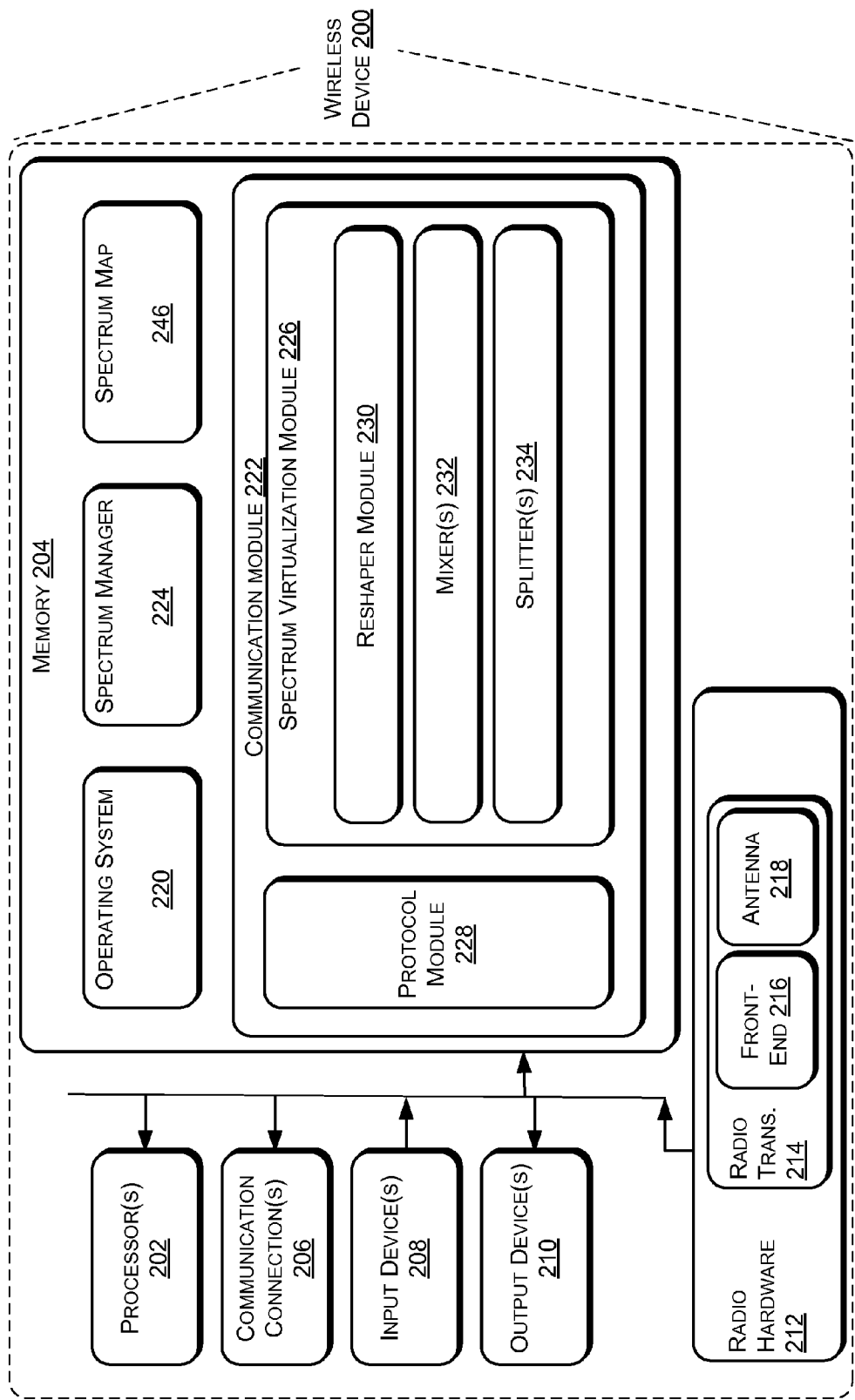
FIG. 2 is a block diagram of an example wireless device having a spectrum virtualization module with a reshaper that employs equalization.

FIG. 2 is a block diagram of an example wireless device including a spectrum virtualization module having a reshaper that employs equalization. The wireless device 200 may be configured as any suitable computing device capable of implementing a wireless device. According to various non-limiting examples, suitable computing devices may include personal computers (PCs), servers, server farms, datacenters, special purpose computers, combinations of these, or any other computing device(s) capable of storing and executing all or part of a wireless device service.

In one example configuration, the wireless device 200 comprises one or more processors 202 and a memory 204. The wireless device 200 may also contain communication connection(s) 206 that allow communications with various devices such as, for example, a white space finder service. The wireless device 200 may also include one or more input devices 208, such as a keyboard, mouse, pen, voice input device, touch input device, etc., and one or more output devices 210, such as a display, speakers, printer, etc. coupled communicatively to the processor(s) 202 and memory 204.

The wireless device 200 includes radio hardware 212. The radio hardware 212 may be implemented as a white-space radio front-end board, or other radio hardware. The radio hardware 212 includes one or more radio transceivers 214, which include radio frequency (RF) front-ends 216 and antenna(e) 218. The radio hardware 212 may be communicatively coupled to the processor(s) 202 and to the memory 204.

The memory 204 may store program instructions, such as software instructions, that are loadable and executable on the processor(s) 202, as well as data generated during execution of, and/or usable in conjunction with, these programs. In the illustrated example, the memory 204 stores an operating system 220, a communication module 222, and a spectrum manager 224. The operating system 220 provides basic system functionality of the wireless device 200 and, among other things, provides for operation of the other programs and modules of the wireless device 200.

The communication module 222 includes a spectrum virtualization module 226 configured to interface with the radio hardware 212 to transmit radio signals to one or more other wireless devices over a physical baseband. The spectrum virtualization module 226 may be the same as one or more of the spectrum virtualization module 118 and the spectrum virtualization module 144 of FIG. 1. The spectrum virtualization module 226 is also configured to interface with the wireless transmission protocol module 228. The protocol module 228 may be the same as one or more of protocol modules 114, 116, and 142 of FIG. 1. The spectrum virtualization module 226 is configured to present a virtual baseband to the protocol module 228, to reshape outgoing virtual baseband signals to physical baseband signals for transmission on the radio hardware 212, and to reshape incoming physical baseband signals. This allows conventional (or non-conventional) PHY protocols to be used for white space transmission without modification.

The spectrum virtualization module 226 includes a reshaper module 230, which may be the same as one or more of the reshaper 120 and the reshaper 150 of FIG. 1.

The decomposition/recomposition module 232 is configured to accept transmission streams produced by the protocol module 228, and to reshape them for transmission on allocated physical frequency bands that have been allocated to the wireless device 200 according to the spectrum map 246.

The spectrum manager 224 may be configured to request and receive information regarding available white space physical transmission frequency bands. The spectrum manager 224 may be the same as spectrum manager 108 in FIG. 1.

Exemplary Reshaping Operations

Figure 3A:
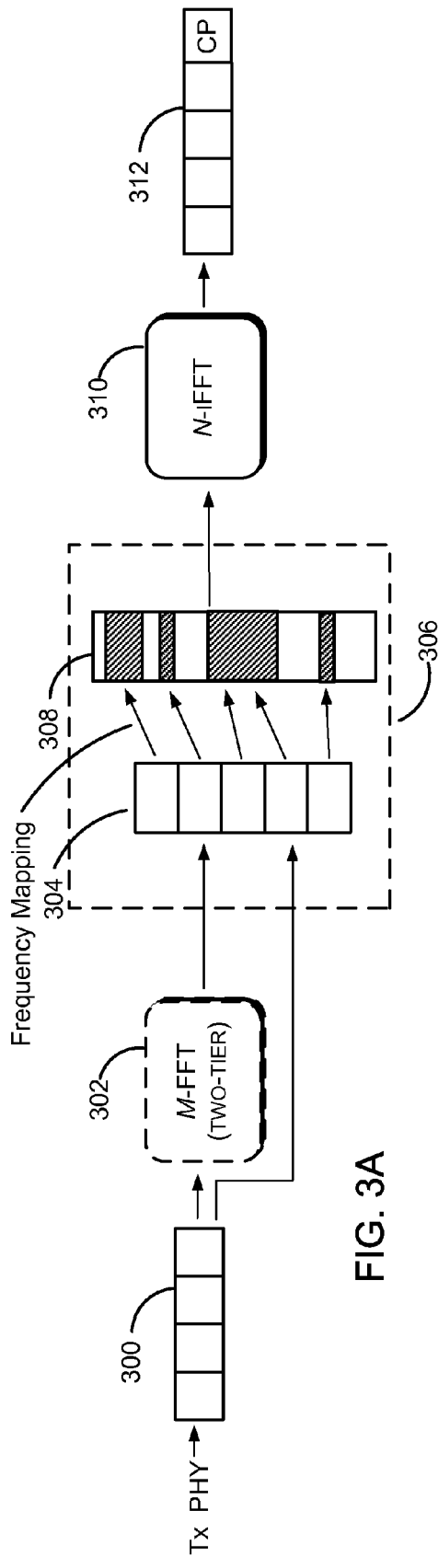
FIG. 3A illustrates the reshaping of PHY layer time-domain transmission signals in the virtual baseband into time-domain symbols with a cyclic prefix in the physical baseband.

FIG. 3A illustrates the reshaping of PHY layer time-domain transmission signals in the virtual baseband into time-domain symbols with a cyclic prefix in the physical baseband. The transmission path Tx begins with the PHY layer generating a transmission stream having time-domain samples 300 in the virtual baseband which are received by a spectrum virtualization layer. M sequential samples of the transmission stream are grouped together by the spectrum virtualization layer in an arbitrary manner. That is, the M samples are grouped without regard for PHY layer transmission symbol boundaries. Also, M is set without regard for, or knowledge of, the size of the PHY layer transmission symbols. The spectrum virtualization layer treats the transmission stream as a raw stream of samples without knowledge of the underlying PHY layer details.

In a two-tier embodiment of the spectrum virtualization layer, an M-point FFT 302 is performed on M samples of time-domain samples 300 to produce M frequency components which are used as M transmission components 304 in the mapping module 306. In a one-tier embodiment, M time-domain samples 300 are passed directly to the mapping module 306, and the mapping module 306 uses the M time-domain samples as the transmission components. The value M determines the resolution of frequency decomposition. M is set to be a default number, such as for example a value of $2^m$, where m is a positive integer. Because the reshaper is "agnostic" to the details of the physical layer protocol, M is not set according to the number of sub-carriers of the virtual baseband.

The mapping module 306 maps M transmission components 304 (either M frequency components in the two-tier embodiment, or M time-domain samples 300 in the one-tier embodiment) to sub-carriers of scaled or unscaled allocated portions of the physical frequency band 308 (the allocated portions are shown shaded in FIG. 3A). An N-point iFFT 310 is performed on the M mapped transmission components 304 to produce a time domain samples of transmission symbol 312 for transmission in the physical frequency band. A cyclic prefix (CP) is appended to the time-domain samples to complete the transmission symbol 312. The length of CP is determined by the multipath delay in the transmission environment. CP can be configured beforehand based on measured multipath delay data. Or, CP can be configured by an online measurement mechanism.

N is chosen such that the resulting number of N sub-carriers is large enough to cover all of the physical frequency bands. If $b_v$ is the width of the virtual baseband, $b_s$ is the aggregated bandwidth of the allocated portions of the physical frequency band 308, and $b_{span}$ is the width of the span of the physical frequency band 308, then where $b_s=b_v$, N satisfies the equation:

$$N \geq M \frac{b_{span}}{b_v}$$

In various embodiments, N is chosen to be the smallest power of 2 that satisfies this equation. Selecting N this way eases computation. The parameters M and N affect the signal processing error rate, the system computation overhead, and the granularity of the spectrum allocation. A larger M and N result in higher computational overhead, and finer granularity of spectrum allocation. This results in increased processing error rate. If the reshaper employs digital signal processing with a representation precision of 16 or 32 bits, a signal's energy is reduced proportionally to window size M and N before performing M-point FFT 302 in order to avoid storage overflow. But a reduction in the signal's energy impacts the representation precision of a signal, which further increases the possibility of processing errors.

In order to map the N sub-carriers to allocated portions of the physical frequency band 308, each allocated portion will be shifted by $-f_{span}$, where $f_{span}$ is the central frequency of the span $B_{span}$ of the physical frequency band 308. Thus, each physical band $B_{p,i}(f_i,b_i) \in \ominus$, is shifted by $(-f_{span})$ to be $\hat{B}_{p,i}(f_i-f_{span}, b_i)$. A sub-carrier is available if it is covered by any $\hat{B}_{p,i}$. An available sub-carrier can be mapped to a frequency component of a baseband signal. There are at least M available sub-carriers in the allocated portions of the physical frequency band 308.

Figure 3B:
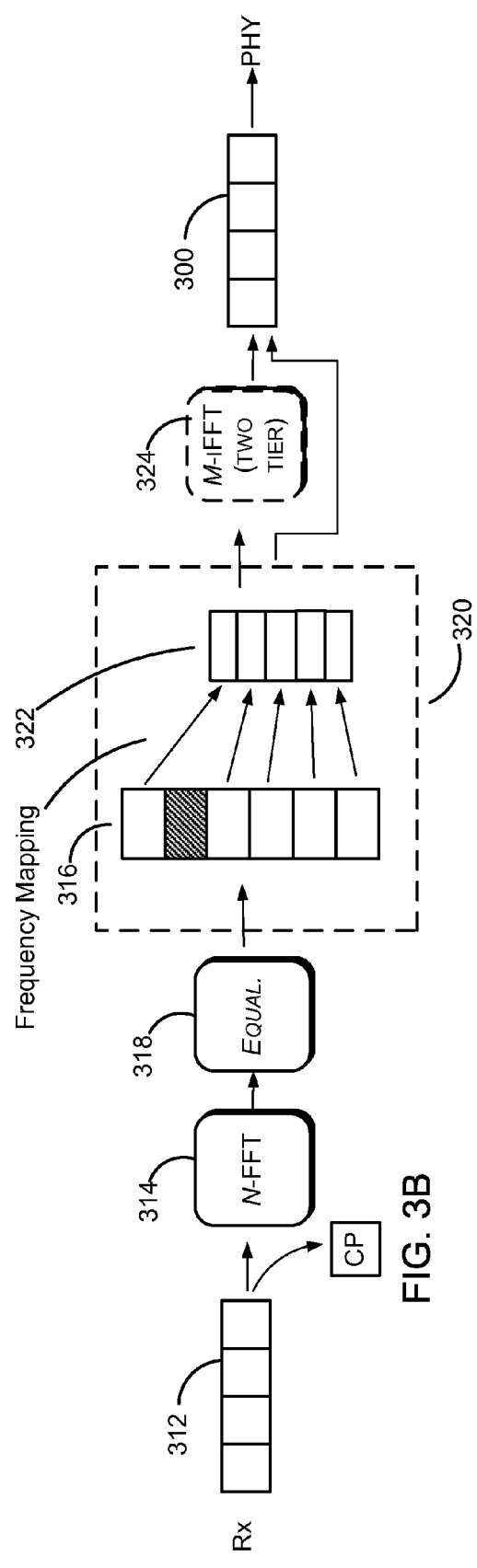
FIG. 3B illustrates the reshaping and equalization of PHY layer time-domain reception symbols in the physical baseband into time-domain samples in the virtual baseband.

FIG. 3B illustrates the reshaping and equalization of PHY layer time-domain reception symbols in the physical baseband into time-domain samples in the virtual baseband. The reception path Rx begins with the spectrum virtualization layer receiving the transmission symbol 312. The transmission symbol 312 is identified and the cyclic prefix CP is stripped away from the symbol prior to further processing by the spectrum virtualization layer.

An N-point FFT 314 is performed on the samples of the transmission symbol 312 to produce N frequency components 316. Equalization 318 is performed on the mapped N frequency components to compensate for signal distortion caused by the reshaping operations, multipath fading, and channel attenuation. A mapping module 320 maps M of the N compensated frequency components from sub-carriers in allocated portions of the physical frequency band 308 to sub-carriers in the virtual spectrum band 322. Thus, some of the N frequency components (such as the shaded frequency component in FIG. 3B) may not be mapped to the virtual spectrum band 322; these unmapped frequency components correspond to signals from the unallocated portions of the physical frequency band 308.

In a two-tier embodiment, an M-point iFFT 324 is performed on the mapped/compensated M frequency components in the virtual baseband to recompose time-domain samples 300 of the transmission stream in the virtual baseband, which are then passed by the spectrum virtualization layer to the PHY layer protocol. In a one-tier embodiment, the mapped/compensated M frequency components represent the recomposed time-domain samples 300 and are passed directly to the PHY layer protocol without further processing.

As noted elsewhere within this Detailed Description, the reshaper scales the physical frequency bands whenever $b_s$ (the aggregated bandwidth of the physical frequency bands) is less than $b_v$ (the virtual bandwidth). The transmitting reshaper scales the physical frequency bandwidths by a factor of $\alpha = b_v/b_s$. Thus, the aggregated bandwidth of the scaled physical frequency bands $\hat{b}_s$ is equal to $b_v$. Whenever scaling is performed, the decomposition/recomposition operations described above are performed using these scaled bandwidths. As is described elsewhere within this Detailed Description, bandwidth adjustment will compensate for this scaling prior to transmission or prior to reshaping (upon reception of a signal in the receive path).

Figure 4:
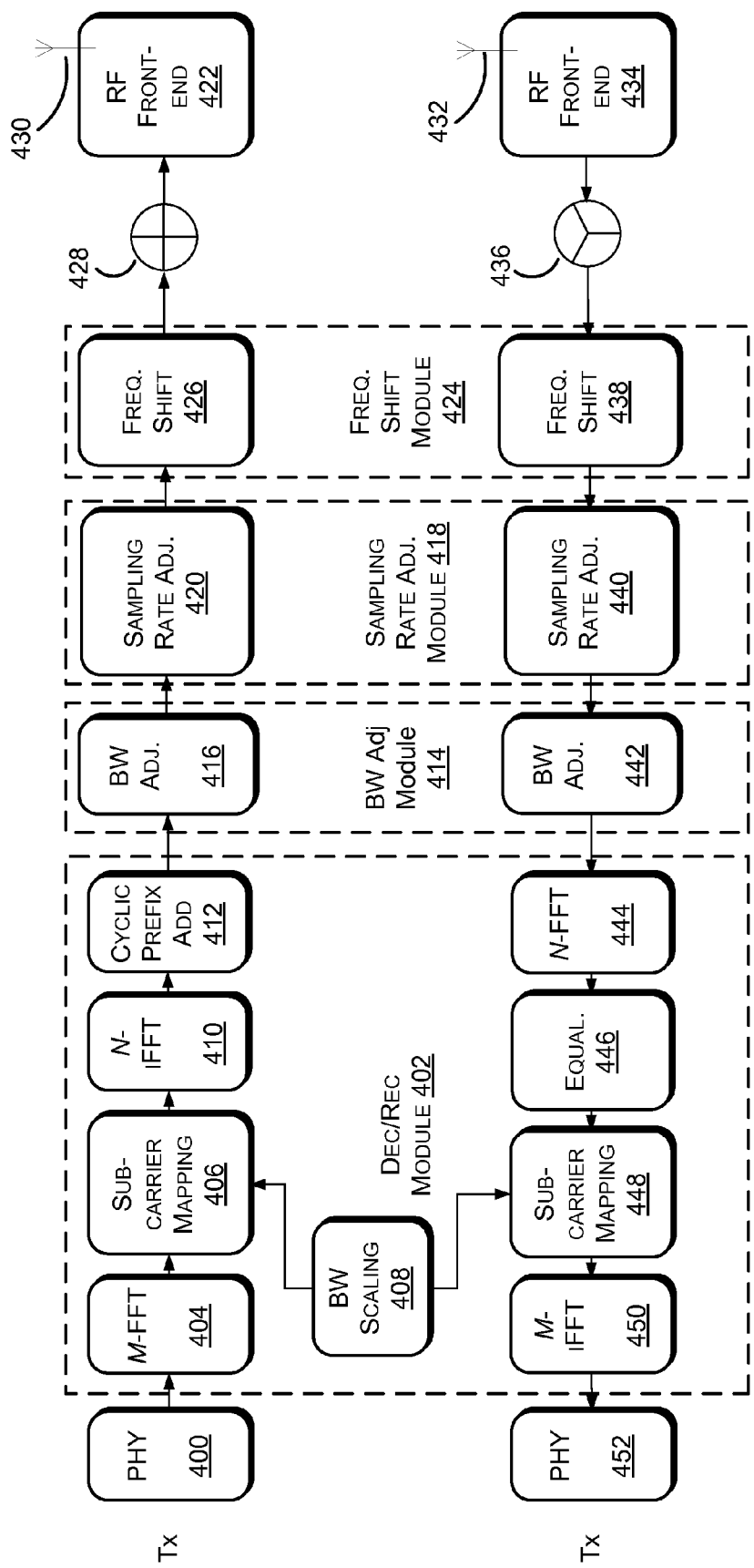
FIG. 4 illustrates transmission and reception paths within a two-tier spectrum virtualization layer employing equalization in accordance with embodiments.

FIG. 4 illustrates transmission and reception paths within a two-tier spectrum virtualization layer employing equalization in accordance with embodiments. In the transmission path Tx, the PHY layer 400 passes a virtual transmission stream, composed of time-domain samples, to a decomposition/recomposition module 402. An M-point FFT 404 is performed on the time-domain samples of the transmission stream to generate M frequency components (i.e., M transmission components). A sub-carrier mapping 406 is performed to map the M frequency components (i.e., transmission components) to sub-carriers of scaled or unscaled allocated portions of the physical frequency band. In certain instances, such as where $b_s$ (the aggregated bandwidth of the physical frequency bands) is less than $b_v$ (the virtual bandwidth), a bandwidth scaling 408 scales the allocated portions of the physical frequency band by a factor of $\alpha = b_v/b_s$. Once the frequency components (transmission components) have been mapped, an N-point iFFT 410 is performed on the mapped frequency components to produce physical time-domain transmission samples of a transmission stream in the (scaled or unscaled) physical frequency bands. A cyclic prefix 412 is added to the physical time-domain transmission samples to produce a physical transmission symbol. The cyclic prefix is added to combat inter-symbol interference. Also, the spectrum virtualization layer will place training symbols at the beginning of each frame so that an equalizer in the receiver can derive the channel model.

A bandwidth adjustment module 414 receives transmission signals (including the physical transmission symbol) from the decomposition/recomposition module 402 and performs a bandwidth adjustment 416 to compensate for bandwidth scaling performed by the bandwidth scaling 408. Where the bandwidth scaling 408 scales the physical frequency bands by a factor $\alpha$, the bandwidth adjustment 416 reduces the bandwidth of the signal by $\alpha$. To reduce the bandwidth of the signal, zero pad samples are added to the signal. In particular, $\alpha$ times more samples are added to the signal to reduce the bandwidth by $\alpha$. This is achieved by interpolation and decimation. In particular, where $\alpha = k/l$, and where k and l are integers, the following steps are taken:

1. Zero padding is performed. For each sample, k−1 zeros are padded.

2. Low-pass filtering is performed. A low-pass filter is applied to the zero-padded samples to remove the high-frequency signal image.

3. Decimation is performed. Every lth sample is picked up to obtain the final signal.

A sampling rate adjustment module 418 receives the bandwidth-adjusted transmission signals and performs a sampling rate adjustment 420 to adjust the sampling rate of the bandwidth-adjusted time-domain transmission symbols to match the sampling rate of the RF front-end 422. The sampling rate adjustment 420 re-samples the transmission symbol using the real sampling rate of the RF front-end 422. The sampling rate adjustment 420 includes interpolation and decimation. For example, where $f_s$ is the sampling rate after the bandwidth adjustment 416, $f_r$ is the real sampling rate of the RF front-end 422, and $f_{LCM}$ is the least common multiple of both $f_s$ and $f_r$, interpolation is accomplished by padding the signal by $m=(f_{LCM}/f_s-1)$ zero samples, and by passing the signal through a low-pass filter to remove imaging. Then, the padded signal is decimated by $n=f_{LCM}/f_r$ to get the final signal with a desired sampling rate of $f_r$. Because the bandwidth adjustment 416 and the sampling rate adjustment 420 utilize the same digital signal processing operations of interpolation and decimation, they are combined together in embodiments to save computation.

The frequency shift module 424 receives the sampling rate-adjusted, bandwidth-adjusted physical transmission signals and performs a frequency shift 426 to compensate for the frequency shift caused by sub-carrier mapping 406. The signal generated by the N-point iFFT 410 is centered at zero. Thus, the sub-carrier mapping 406 shifts the physical bands artificially by $-f_{span}$, where $f_{span}$ is the central frequency of the span $B_{span}$ of the allocated physical bands. The frequency shift 426 compensates for this in order to allow the signals to be transmitted on the actual allocated portions of the physical baseband. The frequency shifting includes multiplying a digital sample $\{x_i\}$ by a factor of $e^{j2\pi f_h i}$ . . . , where j is the imaginary unit, $f_h$ is the amount of frequency (in Hz) to be shifted, and i is the index of samples.

The sampling rate-adjusted, bandwidth-adjusted, frequency-shifted time-domain transmission signals are mixed by the mixer 428 with other transmission signals from other reshapers (not shown) of the spectrum virtualization layer, as needed (e.g., where other reshapers are utilized to reshape transmission symbols from other PHY layers besides the PHY layer 400). The RF front-end 422 receives the mixed transmission signals and transmits them on the physical baseband via the antenna 430.

In the receive path Rx, a receive signal is picked up by the antenna 432 (which may be the same antenna as the antenna 430) on the physical baseband and is passed to the RF front-end 434 (which may be the same RF front-end as the RF front-end 422). The receive signal is passed to the splitter 436 which splits multiple receive signals and passes them to various reshapers. One of the split signals is passed to the frequency shift module 424 which performs a frequency shift 438. The frequency shift 438 is the reverse of the shift operation that occurs in frequency shift 426. The signal is shifted by $-f_{span}$.

The sampling rate adjustment module 418 receives the frequency-shifted signal and performs a sampling rate adjustment 440 to adjust the sampling rate of the signal to be equal to the sampling rate of the virtual baseband. The inverse of the operations performed by the sampling rate adjustment 420 are performed here. The sampling-rate adjusted signal is passed to the bandwidth adjustment module 414, which performs a bandwidth adjustment 442 to adjust the bandwidth in order to compensate for the fact that the bandwidth scaling 408 will artificially scale the physical frequency bands during the recomposition process. The inverse of the operations performed by the bandwidth adjustment 416 are performed here. The bandwidth adjustment 442 occurs only where $b_s$ (the aggregated bandwidth of the physical frequency bands) is less than $b_v$ (the virtual bandwidth).

The decomposition/recomposition module 402 receives the frequency-shifted, sampling rate-adjusted, bandwidth-adjusted signal and identifies a reception symbol. The decomposition/recomposition module 402 performs N-point FFT 444 to produce N frequency components (i.e., N reception components). Equalization 446 is performed on the N reception components to compensate for signal distortion caused by the reshaping operations, multipath fading, and channel attenuation. A subcarrier mapping 448 maps the compensated M of the N reception components that correspond to allocated portions of the physical baseband to subcarriers of the virtual baseband. The mapped/compensated M reception components are passed to an M-point iFFT 450 to produce time-domain samples in the virtual baseband. The virtual baseband time-domain samples are then passed to the PHY layer 452, which may be the same as the PHY layer 400, to approximately reproduce the transmission stream received by a reshaper of the transmitting device (not shown).

Figure 5:
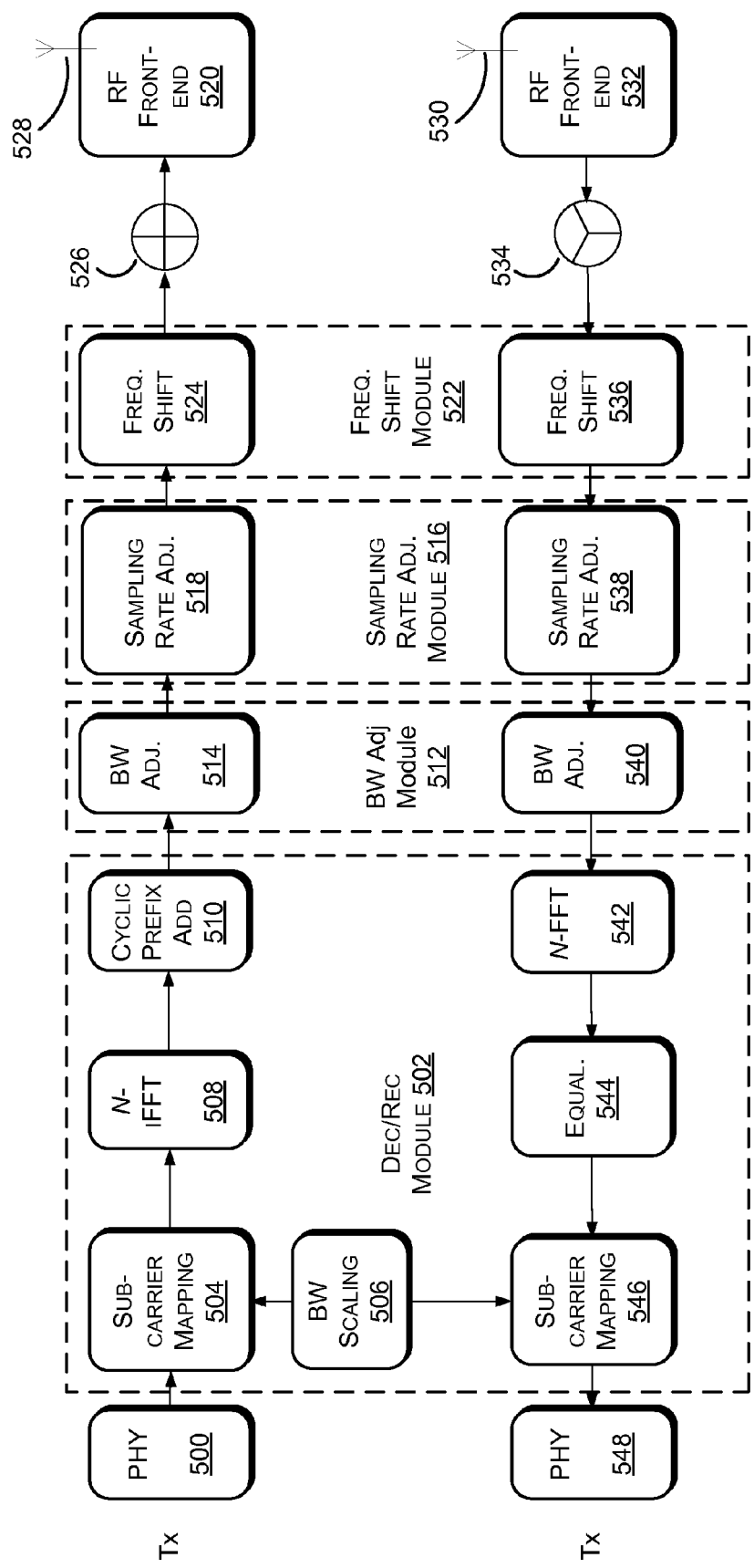
FIG. 5 illustrates transmission and reception paths within a one-tier spectrum virtualization layer employing equalization in accordance with embodiments.

FIG. 5 illustrates transmission and reception paths within a one-tier spectrum virtualization layer employing equalization in accordance with embodiments. In the transmission path Tx, the PHY layer 500 passes a virtual transmission stream, composed of time-domain samples, to a decomposition/recomposition module 502. A sub-carrier mapping 504 is performed to map the M time-domain components (i.e., transmission components) to sub-carriers of scaled or unscaled allocated portions of the physical frequency band. In certain instances, such as where $b_s$ (the aggregated bandwidth of the physical frequency bands) is less than $b_v$ (the virtual bandwidth), a bandwidth scaling 506 scales the allocated portions of the physical frequency band by a factor of $\alpha=b_v/b_s$. Once the transmission components have been mapped, an N-point iFFT 508 is performed on the mapped transmission components to produce physical time-domain transmission samples of a transmission stream in the (scaled or unscaled) physical frequency bands. A cyclic prefix 510 is added to the physical time-domain transmission samples to produce a physical transmission symbol.

A bandwidth adjustment module 512 receives transmission signals (including the physical transmission symbol) from the decomposition/recomposition module 502 and performs a bandwidth adjustment 514 to compensate for bandwidth scaling performed by the bandwidth scaling 506. Where the bandwidth scaling 506 scales the physical frequency bands by a factor $\alpha$, the bandwidth adjustment 514 reduces the bandwidth of the signal by $\alpha$. To reduce the bandwidth of the signal, zero pad samples are added to the signal. In particular, $\alpha$ times more samples are added to the signal to reduce the bandwidth by $\alpha$. This is achieved by interpolation and decimation. In particular, where $\alpha=k/l$, and where k and l are integers, the following steps are taken:

1. Zero padding is performed. For each sample, k−1 zeros are padded.

2. Low-pass filtering is performed. A low-pass filter is applied to the zero-padded samples to remove the high-frequency signal image.

3. Decimation is performed. Every lth sample is picked up to obtain the final signal.

A sampling rate adjustment module 516 receives the bandwidth-adjusted transmission signals and performs a sampling rate adjustment 518 to adjust the sampling rate of the bandwidth-adjusted time-domain transmission symbols to match the sampling rate of the RF front-end 520. The sampling rate adjustment 518 re-samples the transmission symbol using the real sampling rate of the RF front-end 520. The sampling rate adjustment 518 includes interpolation and decimation. For example, where $f_s$ is the sampling rate after the bandwidth adjustment 514, $f_r$ is the real sampling rate of the RF front-end 520, and $f_{LCM}$ is the least common multiple of both $f_s$ and $f_r$, interpolation is accomplished by padding the signal by $m=(f_{LCM}/f_s-1)$ zero samples, and by passing the signal through a low-pass filter to remove imaging. Then, the padded signal is decimated by $n=f_{LCM}/f_r$ to get the final signal with a desired sampling rate of $f_r$. Because the bandwidth adjustment 514 and the sampling rate adjustment 518 utilize the same digital signal processing operations of interpolation and decimation, they are combined together in embodiments to save computation.

The frequency shift module 522 receives the sampling rate-adjusted, bandwidth-adjusted physical transmission signals and performs a frequency shift 524 to compensate for the frequency shift caused by sub-carrier mapping 504. The signal generated by the N-point iFFT 508 is centered at zero. Thus, the sub-carrier mapping 504 shifts the physical bands artificially by $-f_{span}$, where $f_{span}$ is the central frequency of the span $B_{span}$ of the allocated physical bands. The frequency shift 524 compensates for this in order to allow the signals to be transmitted on the actual allocated portions of the physical baseband. The frequency shifting includes multiplying a digital sample $\{x_i\}$ by a factor of $e^{j2\pi f_h i}$, where j is the imaginary unit, $f_h$ is the amount of frequency (in Hz) to be shifted, and i is the index of samples.

The sampling rate-adjusted, bandwidth-adjusted, frequency-shifted time-domain transmission signals are mixed by the mixer 526 with other transmission signals from other reshapers (not shown) of the spectrum virtualization layer, as needed (e.g., where other reshapers are utilized to reshape transmission symbols from other PHY layers besides the PHY layer 500). The RF front-end 520 receives the mixed transmission signals and transmits them on the physical baseband via the antenna 528.

In the receive path Rx, a receive signal is picked up by the antenna 530 (which may be the same antenna as the antenna 528) on the physical baseband and is passed to the RF front-end 532 (which may be the same RF front-end as the RF front-end 520). The receive signal is passed to the splitter 534 which splits multiple receive signals and passes them to various reshapers. One of the split signals is passed to the frequency shift module 522 which performs a frequency shift 536. The frequency shift 536 is the reverse of the shift operation that occurs in frequency shift 524. The signal is shifted by $-f_{span}$.

The sampling rate adjustment module 516 receives the frequency-shifted signal and performs a sampling rate adjustment 538 to adjust the sampling rate of the signal to be equal to the sampling rate of the virtual baseband. The inverse of the operations performed by the sampling rate adjustment 518 are performed here. The sampling-rate adjusted signal is passed to the bandwidth adjustment module 512, which performs a bandwidth adjustment 540 to adjust the bandwidth in order to compensate for the fact that the bandwidth scaling 506 will artificially scale the physical frequency bands during the recomposition process. The inverse of the operations performed by the bandwidth adjustment 514 are performed here. The bandwidth adjustment 540 occurs only where $b_s$ (the aggregated bandwidth of the physical frequency bands) is less than $b_v$ (the virtual bandwidth).

The decomposition/recomposition module 502 receives the frequency-shifted, sampling rate-adjusted, bandwidth-adjusted signal and identifies a reception symbol. The decomposition/recomposition module 502 performs N-point FFT 542 to produce N frequency components (i.e., N reception components). Equalization 544 is performed on the N reception components to compensate for signal distortion caused by the reshaping operations, multipath fading, and channel attenuation. A subcarrier mapping 546 maps M of the N compensated reception components that correspond to allocated portions of the physical baseband to subcarriers of the virtual baseband. The mapped/compensated M reception components are passed to the PHY layer 548, which may be the same as the PHY layer 500, to approximately reproduce the transmission stream received by a reshaper of the transmitting device (not shown).

Example Reshaping Process during Transmission

Figure 6:
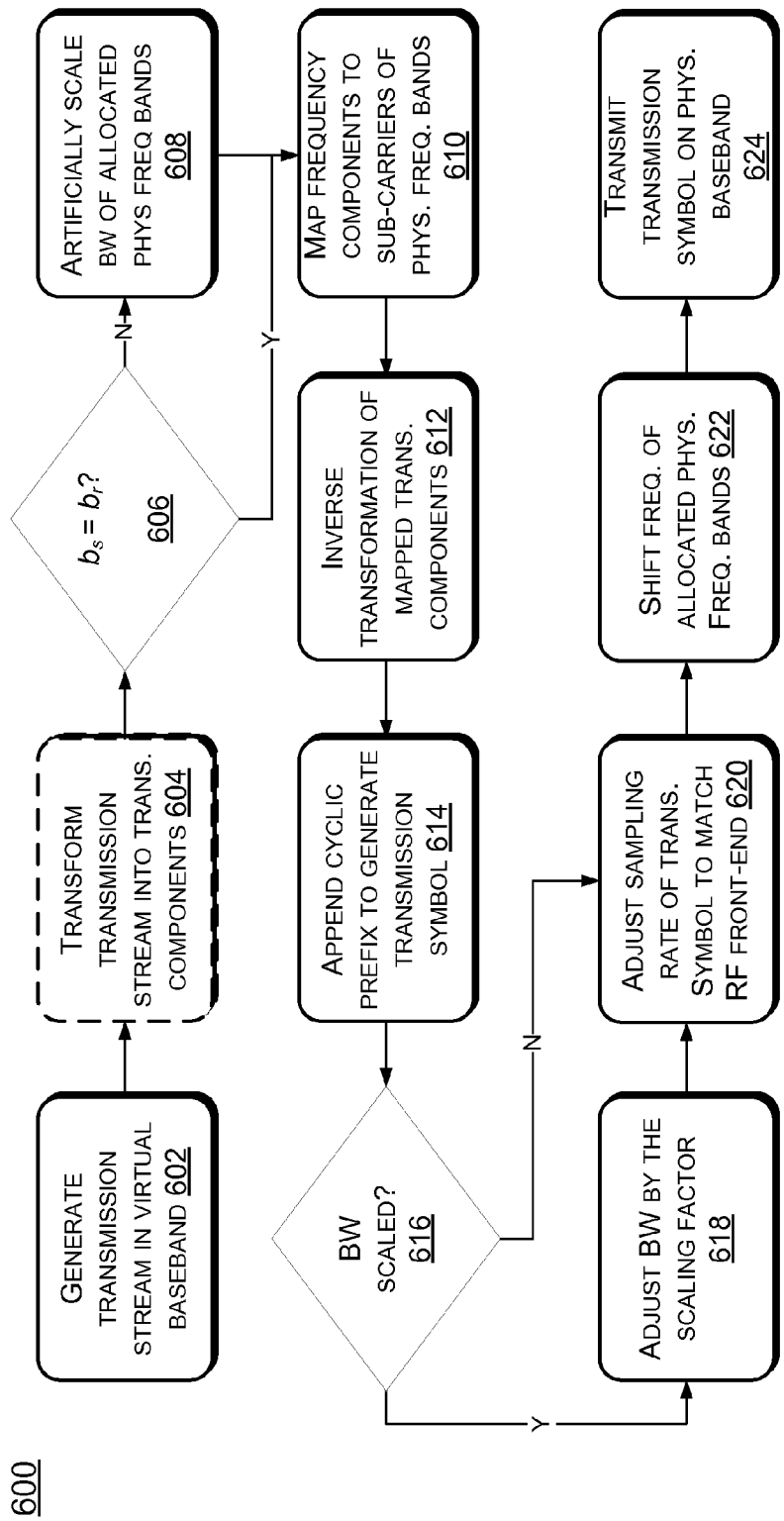
FIG. 6 is a flow diagram showing an example process of reshaping during transmission to produce transmission symbols with a cyclic prefix.

FIG. 6 is a flow diagram showing an example process 600 of reshaping during transmission to produce transmission symbols with a cyclic prefix. A PHY layer generates a transmission stream in a virtual baseband, block 602. In embodiments where the PHY layer is part of a conventional wireless protocol, the virtual frequency band may be contiguous and non-variable.

In a two-tier embodiment, a spectrum virtualization layer receives the transmission stream and performs a transformation of the time-domain samples of the transmission stream to derive a plurality of frequency components (i.e., transmission components), block 604. The transformation may be an M-point FFT that produces M frequency components. M is the resolution of the FFT process, and is set to be any number, and may be set for ease of computation to be equal to $2^m$, where m is any positive integer. In a one-tier embodiment, a transformation of the time-domain samples of the transmission stream is not performed. In the one-tier embodiment, the transmission components are the time-domain samples of the virtual transmission stream, and not frequency components derived from those time-domain samples as in the two-tier embodiments.

Where $b_s$ (the aggregated bandwidth of the physical frequency bands) is less than $b_v$ (the virtual bandwidth), block 606, the spectrum virtualization layer artificially scales the bandwidth of the allocated physical frequency bands, block 608. The spectrum virtualization layer scales the one or more allocated physical frequency bands by a factor α determined at least in part by a ratio of an aggregate bandwidth of the one or more allocated physical frequency bands and a virtual bandwidth of the virtual frequency band.

The spectrum virtualization layer maps the transmission components associated with the transmission stream to subcarriers of the scaled or un-scaled ones of the one or more allocated physical frequency bands, block 610. The mapping process includes a frequency shift of the one or more allocated physical frequency bands by an amount equal to $-f_{span}$, where $f_{span}$ is the central frequency of the span $B_{span}$ of the allocated physical bands.

The spectrum virtualization layer performs an inverse transformation on the plurality of transmission components to generate physical time-domain transmission samples, block 612. In embodiments, the spectrum virtualization layer performs an N-point iFFT on the mapped M transmission components. As noted elsewhere within this Detailed Description, N is at least as large as M multiplied by a ratio that is a function of the virtual bandwidth and the associated aggregate bandwidth.

The spectrum virtualization layer appends a cyclic prefix to the physical time-domain transmission samples to produce a physical transmission symbol, block 614. The length of the cyclic prefix in is determined by the multipath delay in a testing environment. The cyclic prefix can be configured based on the measured multipath delay data, or the cyclic prefix can be configured automatically configured by an online measurement mechanism.

If the physical frequency bands have been scaled by a factor α to account for the fact that $b_s$ (the aggregated bandwidth of the physical frequency bands) is less than $b_v$ (the virtual bandwidth), block 616, then the spectrum virtualization layer adjusts the bandwidth of the time-domain signal that includes the transmission symbol by the same factor α, block 618. This adjustment includes the digital signal processing steps of interpolation (zero padding of the signal samples), low-pass filtering, and decimation.

The spectrum virtualization layer adjusts the sampling rate of the transmission signal to match the sampling rate of the radio front-end, block 620. The sampling rate adjustment includes interpolation and decimation. Because bandwidth adjustment and sampling rate adjustment use similar digital signal processing operations, embodiments may combine the two processes to decrease computational overhead.

The spectrum virtualization layer shifts the frequencies of the sampling rate-adjusted signal to compensate for a frequency shift that occurs during the mapping process, block 622. Shifting the frequency includes multiplying a digital sample, such as $\{x_i\}$, by a factor of $e^{j2\pi f_h i}$.

The radio front-end transmits the transmission signal on the physical baseband, block 624. Thus, a PHY layer transmission stream, generated on a contiguous, fixed virtual baseband is reshaped and transmitted on non-contiguous and variable allocated portions of the physical baseband.

Example Reshaping Process during Reception

Figure 7:
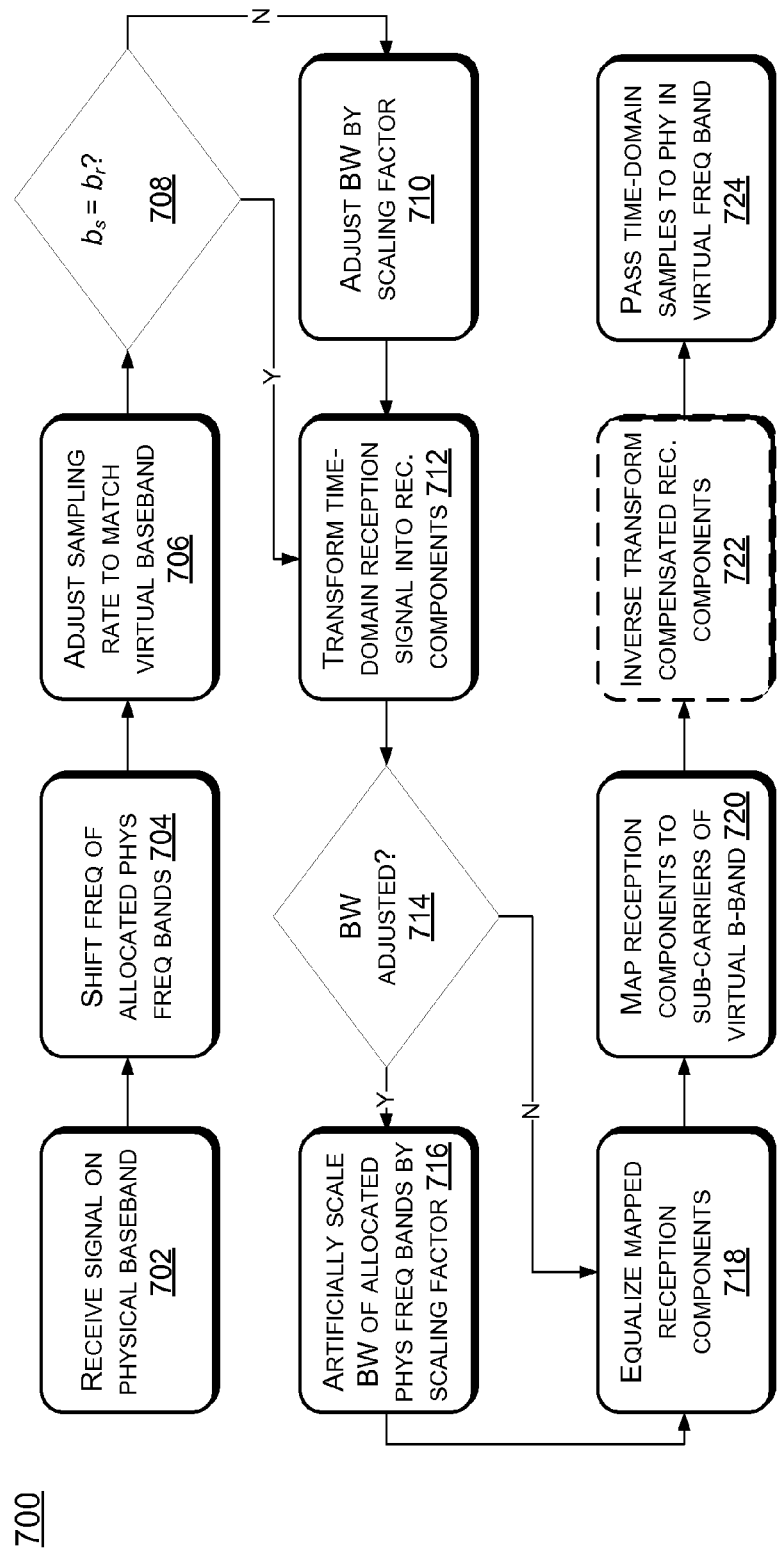
FIG. 7 is a flow diagram showing an example process of reshaping that employs equalization during reception.

FIG. 7 is a flow diagram showing an example process 700 of reshaping that employs equalization during reception. A radio front-end receives a signal on a physical baseband, block 702. The physical baseband may include one or more non-contiguous portions allocated for transmission by one or more wireless devices. The wireless devices may employ a conventional PHY layer protocol which sets forth a fixed, contiguous virtual frequency band for transmission that differs from the physical baseband. The wireless device may also employ a spectrum virtualization layer to map the incoming signals from the physical spectrum band to the virtual frequency band A frequency shift module shifts the frequency of the allocated physical frequency band, block 704. This frequency shift compensates for a frequency shift that occurs during a remapping operation later in the reception path. The frequency is shifted by the frequency shift module by an amount equal to a negative of a central frequency of a span of the one or more allocated physical frequency bands.

A sampling rate adjustment module adjusts the sampling rate of the received signal to match the sampling rate of the virtual baseband, block 706. Operations here are the inverse of operations performed with respect to block 620 of FIG. 6.

Where $b_s$ (the aggregated bandwidth of the physical frequency bands) is less than $b_v$ (the virtual bandwidth), block 708, a bandwidth adjustment module scales the frequency of the signal by a factor $\alpha$ so as to make $b_s$ equal to $b_v$, block 710. Operations here are the inverse of operations performed with respect to block 618 of FIG. 6.

A reshaper obtains the frequency-shifted, sampling rate-adjusted, bandwidth-adjusted signal, identifies a reception symbol in the signal, and performs a transformation on time-domain samples of the reception symbol to produce a plurality of frequency components of the signal, block 712. The reshaper may perform an N-point FFT on the time-domain samples of the reception symbol to produce N frequency components (i.e., N reception components). The reshaper also strips away the cyclic prefix prior to performing the transformation.

If the bandwidth of the signal was adjusted by a bandwidth adjustment module by a factor $\alpha$, block 714, the reshaper will artificially scale the physical frequency bands by the same factor $\alpha$, block 716. The bandwidth scaling enables the reception components of the reception signal to be mapped to sub-carriers of the virtual frequency band.

An equalizer compensates the reception components for signal distortion caused by reshaping operations, multi-path fading, and channel attenuation, block 718. The equalizer uses training symbols at the beginning of the frame to derive the channel model.

The spectrum virtualization layer maps the compensated reception components to sub-carriers of the virtual frequency band, block 720. M of the N reception components produced by the N-point FFT that correspond to allocated portions of the physical baseband are mapped to sub-carriers of the virtual frequency band. The mapping process includes a frequency shift of the one or more allocated physical frequency bands by an amount equal to $-f_{span}$, where $f_{span}$ is the central frequency of the span $B_{span}$ of the allocated physical bands.

In a two-tier embodiment, the spectrum virtualization layer performs an inverse transform on the compensated mapped reception components to produce time-domain samples of a transmission stream in the virtual frequency band, block 722. The two-tier spectrum virtualization layer performs an M-point iFFT on the M mapped frequency components to produce the time-domain samples of the transmission stream in the virtual frequency band. In a one-tier spectrum virtualization layer, the mapped reception components include the time-domain samples of the transmission stream. By contrast, in the two-tier spectrum virtualization layer, the mapped reception components are inverse transformed to produce the time domain samples of the transmission stream.

The spectrum virtualization layer passes the recomposed time-domain samples of the transmission stream to the PHY layer in the virtual frequency band, block 724. Any distortion not compensated by the equalization process can be handled using mechanisms available in the conventional PHY protocol.

Computer-Readable Media

Depending on the configuration and type of computing device used, memory 204 of wireless device 200 in FIG. 2 may include volatile memory (such as random access memory (RAM)) and/or non-volatile memory (such as read-only memory (ROM), flash memory, etc.). Memory 204 may also include additional removable storage and/or non-removable storage including, but not limited to, flash memory, magnetic storage, optical storage, and/or tape storage that may provide non-volatile storage of computer-readable instructions, data structures, program modules, and other data for wireless device 200.

Memory 204 is an example of computer-readable media. Computer-readable media includes at least two types of computer-readable media, namely computer storage media and communications media.

Computer storage media includes volatile and non-volatile, removable and non-removable media implemented in any process or technology for storage of information such as computer-readable instructions, software, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:
1. A method, comprising:
  mapping, by a spectrum virtualization module of a wireless device, a plurality of transmission components associated with a transmission stream produced by a wireless physical layer protocol module of the wireless device for transmission in a virtual frequency band to sub-carriers associated with one or more allocated physical frequency bands, wherein:
  the plurality of transmission components associated with the transmission stream includes M frequency components, wherein M is an integer that is not less than one;
  the virtual frequency band has a virtual bandwidth; and
  the one or more allocated physical frequency bands are part of a physical baseband;
performing an M-point fast Fourier transform on a plurality of time-domain samples of the transmission stream to derive the M frequency components;
performing an N-point inverse fast Fourier transform on the mapped plurality of the M frequency components to derive a plurality of physical time-domain transmission samples, wherein N is an integer that is not less than one and, wherein N is at least as large as M multiplied by a ratio that is a function of the virtual bandwidth and a span of the physical baseband;
appending, by the spectrum virtualization module, a cyclic prefix to a plurality of physical time-domain transmission samples derived by transformation of the plurality of the mapped transmission components associated with the transmission stream to generate a physical transmission symbol for transmission on the one or more allocated physical frequency bands; and
outputting the physical transmission symbol by the spectrum virtualization module.

2. The method of claim 1, wherein the plurality of transmission components associated with the transmission stream includes M time-domain samples of the transmission stream, and wherein the method further comprises deriving the plurality of physical time-domain transmission samples by performing an N-point inverse fast Fourier transform on mapped ones of the M time-domain samples of the transmission stream.

3. The method of claim 1, further comprising determining a length of the cyclic prefix based on a multipath delay.

4. The method of claim 1, further comprising:
  scaling, by a bandwidth scaling module of the wireless device, the one or more allocated physical frequency bands by a factor determined at least in part by a ratio of an aggregate bandwidth of the one or more allocated physical frequency bands and a the virtual bandwidth of the virtual frequency band; and
  reducing, by a bandwidth adjustment module, one or more transmission bandwidths of a transmission signal that includes the transmission symbol by the factor, wherein the mapping includes mapping the plurality of transmission components associated with the transmission stream to sub-carriers of scaled ones of the one or more allocated physical frequency bands.

5. The method of claim 4, wherein the reducing comprises adding zero-pad samples to the transmission signal, low-pass filtering the zero-pad samples, and decimating the transmission signal to produce a bandwidth-adjusted transmission signal.

6. The method of claim 1, further comprising adjusting, by a sampling rate adjustment module, a sampling rate of a transmission signal that includes the transmission symbol, the adjusting including adding zero-pad samples to the transmission signal, low-pass filtering the transmission signal, and decimating the transmission signal.

7. The method of claim 1, further comprising shifting, by a frequency shift module, frequencies of the one or more allocated physical frequency bands by an amount equal to a central frequency of a span of the one or more allocated physical frequency bands upon the mapping of the plurality of transmission components associated with the transmission stream to the sub-carriers associated with the one or more allocated physical frequency bands.

8. A method, comprising:
  receiving, by a spectrum virtualization module of a wireless device, a receive signal from a radio front-end of the wireless device, the receive signal received by the wireless device on one or more allocated physical transmission bands and including a receive symbol;
  performing, by the spectrum virtualization module, an N-point fast Fourier transform on time-domain samples of the receive symbol to produce N reception components, wherein N is an integer that is not less than one;
  equalizing, by the spectrum virtualization module, the N reception components to compensate for channel distortion;
  mapping, by the spectrum virtualization module, M of the N compensated reception components that correspond to the one or more allocated physical transmission bands to sub-carriers of a virtual frequency band, wherein M is an integer that is not less than one; and
  passing, by the spectrum virtualization module, time-domain samples associated with the M mapped compensated reception components to a wireless physical layer protocol module.

9. The method of claim 8, further comprising performing, by the spectrum virtualization module, an M-point inverse fast Fourier transform on the M mapped compensated reception components to produce the time-domain samples associated with the M mapped compensated reception components.

10. The method of claim 8, further comprising identifying the receive symbol, and removing a cyclic prefix prior to performing the N-point fast Fourier transform.

11. The method of claim 8, further comprising adjusting the receive signal to match a virtual sampling rate of the virtual frequency band.

12. The method of claim 8, further comprising shifting frequencies of the one or more allocated physical frequency bands to compensate for a frequency shift caused by the mapping.

13. A wireless device, comprising:
  a processor;
  a memory;
  a radio front-end configured to wirelessly transmit and receive on a physical frequency band;
  a physical layer protocol module stored in the memory and executable by the processor to generate a transmission stream for transmission on a virtual transmission band;
  a decomposition/recomposition module stored in the memory and executable by the processor to map M transmission components associated with the transmission stream to sub-carriers associated with one or more portions of the physical frequency band that are allocated for transmission, to perform an N-point inverse fast Fourier transform on the mapped M transmission components to produce time-domain samples, and to generate a transmission signal that includes a transmission symbol for transmission by the radio front-end by appending a cyclic prefix to the time-domain samples, wherein M is an integer that is not less than one and wherein N is an integer that is not less than one;
  a bandwidth scaling module configured to scale the one or more portions of the physical frequency band allocated for transmission by a factor that is determined at least in part by a ratio of an aggregated physical bandwidth of the one or more portions of the physical frequency band allocated for transmission and a virtual bandwidth of the virtual transmission band, wherein the decomposition/recomposition module is further configured to map the M transmission components to the sub-carriers associated with the one or more allocated portions of the physical frequency band based on scaled ones of the one or more portions of the physical frequency band; and a bandwidth adjustment module configured to reduce a transmission bandwidth of the transmission signal by the factor.

14. The wireless device of claim 13, wherein the bandwidth adjustment module is further configured to reduce the transmission bandwidth by addition of zero-pad samples to the transmission signal, low-pass filtering of the zero-padded samples, and decimation of the transmission signal.

15. The wireless device of claim 13, wherein the decomposition/recomposition module is further configured to generate the M transmission components by performing an M-point fast Fourier transform on M time-domain samples of the transmission stream, wherein M is selected independently of the number of sub-carriers in the virtual transmission band.

16. The wireless device of claim 13, wherein the decomposition/recomposition module is further configured to perform an N-point fast Fourier transform on a receive symbol to produce N receive components, to reverse map M of the N receive components corresponding to portions of a physical frequency band allocated for reception to a virtual reception band, to equalize the mapped M receive components to compensate for signal distortion, and to perform an M-point inverse fast Fourier transform on the compensated M receive components to produce time-domain samples of a reception stream in the virtual reception band.

* * * * *